United States Patent
Nakano et al.

(10) Patent No.: US 7,029,836 B2
(45) Date of Patent: Apr. 18, 2006

(54) RADIOGRAPHIC IMAGE CONVERSION PANEL AND METHOD FOR MANUFACTURING THE SAME

(75) Inventors: Kuniaki Nakano, Hino (JP); Osamu Morikawa, Hino (JP); Akihiro Maezawa, Hino (JP); Satoshi Honda, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 87 days.

(21) Appl. No.: 10/774,016

(22) Filed: Feb. 6, 2004

(65) Prior Publication Data

US 2004/0155224 A1    Aug. 12, 2004

(30) Foreign Application Priority Data

Feb. 10, 2003  (JP) .............................. 2003-032238
Feb. 25, 2003  (JP) .............................. 2003-047252
Feb. 25, 2003  (JP) .............................. 2003-047253

(51) Int. Cl.
*G03C 1/725*    (2006.01)
*G03C 5/17*     (2006.01)
*G03B 42/08*    (2006.01)
*C09K 11/08*    (2006.01)
*C23C 16/08*    (2006.01)

(52) U.S. Cl. .................. 430/496; 430/21; 430/139; 252/301.6; 252/301.4; 250/484.4; 427/157; 427/255.39

(58) Field of Classification Search .................. 430/21, 430/139, 496; 252/301.6, 301.4; 427/157, 427/255.39; 250/484.4
See application file for complete search history.

(56) References Cited

U.S. PATENT DOCUMENTS

| | | |
|---|---|---|
| 4,947,046 A | 8/1990 | Kawabata et al. |
| 2003/0222224 A1 | 12/2003 | Maezawa et al. |
| 2005/0040340 A1* | 2/2005 | Morikawa et al. ....... 250/484.4 |

FOREIGN PATENT DOCUMENTS

EP    1385050    1/2004

OTHER PUBLICATIONS

Patent Abstracts of Japan (1 pg) vol. 13, No. 096, Mar. 7, 1989.
Patent Abstracts of Japan (1 pg) vol. 10, No. 239, Aug. 19, 1986.

* cited by examiner

*Primary Examiner*—Richard L. Schilling
(74) *Attorney, Agent, or Firm*—Lucas & Mercanti LLP

(57) ABSTRACT

A radiographic image conversion panel including a support, and at least one photostimulable phosphor layer formed on the support by a vapor phase deposition method (vapor phase growth). The panel is manufactured according to deposition, and a temperature of the support at the time of deposition is controlled at 50° C. to 150° C.

8 Claims, 7 Drawing Sheets

RADIOGRAPHIC IMAGE CONVERSION PANEL AND METHOD FOR MANUFACTURING THE SAME

BACKGROUND OF THE INVENTION

1. Field of the Invention

The present invention relates to a radiographic image conversion panel using photostimulable phosphors, and to a method for manufacturing the radiographic image conversion panel.

2. Description of Related Art

Recently, methods for imaging a radiographic image by a radiographic image conversion panel utilizing photostimulable phosphors have been used.

As an example of such methods, there is the one using a radiographic image conversion panel in which a photostimulable phosphor layer is formed on a support (see, for example, U.S. Pat. No. 3,859,527 and Japanese Patent Application Laid-Open Publication No. Sho 55-12144).

Radioactive rays transmitted through a subject are irradiated to the photostimulable phosphor layer of such a radiographic image conversion panel to form a latent image (accumulated image) by accumulating the radiation energy corresponding to radiation transmittance of each portion of the subject in the photostimulable phosphor layer. Then, the radiation energy accumulated in each portion is converted into light by scanning the photostimulable phosphor layer with photostimulated excitation light (laser beams are used), and the intensity of the light is read to obtain an image. The image may be reproduced on various displays such as CRT and the like, or may be reproduced as a hardcopy.

It is required for the photostimulable phosphor layer of the radiographic image conversion panel used in the radiographic image conversion method to have high radiation absorptivity and optical conversion rate, to have good granularity of images, and to have high sharpness.

Generally, in order to make the radiation sensitivity high, it is required to make the layer thickness of a photostimulable phosphor layer thick. However, if it is too thick, there occurs a phenomenon such that luminescence does not come out because of scattering of photostimulated luminescence among photostimulable phosphor particles, and there is limitation.

Further, as for the sharpness, the thinner the photostimulable phosphor layer becomes, the more the sharpness improves. However, if it is too thin, the decrease of the sensitivity becomes large.

Further, as for the granularity, the granularity of an image is determined by local fluctuation of radiation quantum number (quantum mottle), by structural disarrangement (structure mottle) of the photostimulable phosphor layer of a radiographic image conversion panel, or the like. Therefore, when the layer thickness of the photostimulable phosphor layer becomes thin, deterioration of image quality occurs because the radiation quantum number to be absorbed in the photostimulable phosphor layer decreases and the mottle increases or because the structural disarrangement becomes obvious and the structure mottle increases. Accordingly, it is required to make the layer thickness of the photostimulable phosphor layer thick in order to improve the granularity of an image.

Thus, the image quality and sensitivity of the radiographic image conversion method using a radiographic image conversion panel are determined by various factors. Various studies have been made in order to improve the sensitivity and image quality by adjusting a plurality of factors relating to these sensitivity or image quality.

Among these, as a method for improving the sharpness of a radiographic image, for example, attempts for improving sensitivity and sharpness by controlling the shape itself of photostimulable phosphors to be formed have been made.

As one of these attempts, there is a method for using a photostimulable phosphor layer having a fine quasi-columnar block formed by depositing a photostimulable phosphor on a support having a fine concavoconvex pattern (for example, see Japanese Patent Laid-Open Publication No. Sho 61-142497). Further, a method for using a radiographic image conversion panel having a photostimulable phosphor layer in which cracks between columnar blocks obtained by depositing a photostimulable phosphor on a support having a fine pattern are shock-treated to be further developed (for example, see Japanese Patent Laid-Open Publication No. Sho 61-142500), further, a method for using a quasi-columnar radiographic image conversion panel in which cracks are generated from the surface side of a photostimulable phosphor layer formed on a face of a support (for example, see Japanese Patent Laid-Open Publication No. Sho 62-39737), furthermore, a method for providing cracks by forming a photostimulable phosphor layer having a void on an upper face of a support according to deposition, and thereafter, by growing voids according to heat treatment (for example, see Japanese Patent Laid-Open Publication No. Sho 62-110200), and the like are suggested.

Recently, a method for forming a photostimulable phosphor layer in a predetermined thickness by adjusting the intersection angle between the stream line of vapor flow of the photostimulable phosphor component and the support face in a specific range at the time of manufacturing the photostimulable phosphor layer on the support by using a vapor phase deposition method is disclosed (for example, see Japanese Patent Application Laid-Open Publication No. Sho 62-157600). Furthermore, a radiographic image conversion panel having a photostimulable phosphor layer in which an elongated columnar crystal having a constant slope to a normal line direction of a support is formed on the support according to a vapor phase deposition method (for example, see Japanese Patent No. 2899812 and Japanese Patent Application Laid-Open Publication No. Hei 2-58000) is suggested.

In these attempts of controlling the shape of a phosphor layer, it is a prospect to improve image quality by making a phosphor layer into a columnar crystal structure. Particularly, dispersion in the traverse direction of photostimulated excitation light (or photostimulated luminescence) can be suppressed by making the photostimulable phosphor layer into a columnar shape (can reach the face of a support by repeating reflection in a crack (columnar crystal) interface). Therefore, it is possible to remarkably increase the sharpness of an image by photostimulated luminance.

In these radiographic image conversion panels having a photostimulable phosphor layer formed by a vapor phase growth (deposition), the relation between the sensitivity and sharpness improves. Further, attempts such as suppressing reflection or refraction at the layer interface in a radiographic image conversion panel to further improve image quality by further combining a low reflective index layer with a phosphor layer including a quasi-columnar or columnar photostimulable phosphor crystals, and the like have been made (for example, see Japanese Patent Laid-Open Publication No. Hei 1-131498).

However, in a radiographic image conversion panel having a photostimulable phosphor layer formed by the above-described vapor phase growth (deposition), when a film is formed in a region that the temperature of a support is comparatively high, because elongated columnar crystals forming the photostimulable phosphor layer are formed on the support (substrate), there is a case that the adhesive property (adhesiveness) of the columnar crystals with the support is not sufficient, so that the phosphor layer is easily peeled off after the formation of the photostimulable phosphor layer. Therefore, improvement of durability has been required. Further, when a film is formed in a region that the temperature of a support is comparatively low, though adhesive property of a columnar crystal with the support is sufficient, the growth of the columnar crystal is not sufficient, so that the luminance and the sharpness decrease. Further, the lower the temperature of the support is, the more difficult it is to keep the temperature of the support uniform. As a result, unevenness of the image quality such as unevenness of luminance easily occurs. Therefore, improvement and uniformization of luminance and sharpness and improvement of adhesive property have been required.

SUMMARY OF THE INVENTION

The present invention was made in view of the above-describe problems. An object of the present invention is to provide a radiographic image conversion panel having good adhesive property (adhesiveness) of a photostimulable phosphor layer with a support, and further, showing high luminescence intensity and high sharpness, and moreover, having no luminance unevenness; and to provide a method for manufacturing the radiographic image conversion panel.

In order to achieve the above-described object, according to a first aspect of the present invention, the radiographic image conversion panel of the present invention comprises a support; and at least one photostimulable phosphor layer formed on the support by a vapor phase deposition method, wherein the panel is manufactured according to deposition, a temperature of the support at a time of the deposition being controlled at 50° C. to 150° C.

In the radiographic image conversion panel in the first aspect, preferably, the at least one photostimulable phosphor layer contains a photostimulable phosphor represented by the following Formula (1), $$M^1X \cdot aM^2X'_2 \cdot bM^3X''_3 : eA \qquad (1)$$

wherein the $M^1$ is at least one alkali metal atom selected from the group consisting of Li, Na, K, Rb and Cs; the $M^2$ is at least one bivalent metal atom selected from the group consisting of Be, Mg, Ca, Sr, Ba, Zn, Cd, Cu and Ni; the $M^3$ is at least one tervalent metal atom selected from the group consisting of Sc, Y, La, Ce, Pr, Nd, Pm, Sm, Eu, Gd, Tb, Dy, Ho, Er, Tm, Yb, Lu, Al, Ga and In; each of the X, X' and X" is at least one halogen atom selected from the group consisting of F atom, Cl atom, Br atom and I atom; the A is at least one metal atom selected from the group consisting of Eu, Tb, In, Ce, Tm, Dy, Pr, Ho, Nd, Yb, Er, Gd, Lu, Sm, Y, Tl, Na, Ag, Cu and Mg; and each of the a, b and e represents a numeric value in a range of $0 \leq a < 0.5$, $0 \leq b < 0.5$ and $0 < e \leq 0.2$.

Further, particularly, the at least one photostimulable phosphor layer preferably contains a photostimulable phosphor including CsBr.

According to a second aspect of the present invention, the radiographic image conversion panel of the present invention comprises a support; and at least one photostimulable phosphor layer formed on the support by a vapor phase deposition method, wherein the at least one photostimulable phosphor layer is formed through a step of heating one face of the support and cooling the other face of the support when entering vapor flow including photostimulable phosphor raw materials to the support.

In the radiographic image conversion panel in the second aspect, preferably, the at least one photostimulable phosphor layer contains a photostimulable phosphor represented by the following Formula (1), $$M^1X \cdot aM^2X'_2 \cdot bM^3X''_3 : eA \qquad (1)$$

wherein the $M^1$ is at least one alkali metal atom selected from the group consisting of Li, Na, K, Rb and Cs; the $M^2$ is at least one bivalent metal atom selected from the group consisting of Be, Mg, Ca, Sr, Ba, Zn, Cd, Cu and Ni; the $M^3$ is at least one tervalent metal atom selected from the group consisting of Sc, Y, La, Ce, Pr, Nd, Pm, Sm, Eu, Gd, Tb, Dy, Ho, Er, Tm, Yb, Lu, Al, Ga and In; each of the X, X' and X" is at least one halogen atom selected from the group consisting of F atom, Cl atom, Br atom and I atom; the A is at least one metal atom selected from the group consisting of Eu, Tb, In, Ce, Tm, Dy, Pr, Ho, Nd, Yb, Er, Gd, Lu, Sm, Y, Tl, Na, Ag, Cu and Mg; and each of the a, b and e represents a numeric value in a range of $0 \leq a < 0.5$, $0 \leq b < 0.5$ and $0 < e \leq 0.2$.

Further, particularly, the at least one photostimulable phosphor layer preferably contains a photostimulable phosphor including CsBr.

According to a third aspect of the present invention, the method for manufacturing a radiographic image conversion panel having at least one photostimulable phosphor layer formed on a support by a vapor phase deposition method, of the present invention comprises bending the support by adjusting a curvature radius R of one face of the support so as to be in a range of 1000 mm to 10000 mm; entering vapor flow including photostimulable phosphor raw material to a convex face formed by bending the support; and forming the at least one photostimulable phosphor layer on the support.

In the method for manufacturing the radiographic image conversion panel in the third aspect, preferably, the at least one photostimulable phosphor layer contains a photostimulable phosphor represented by the following Formula (1), $$M^1X \cdot aM^2X'_2 \cdot bM^3X''_3 : eA \qquad (1)$$

wherein the $M^1$ is at least one alkali metal atom selected from the group consisting of Li, Na, K, Rb and Cs; the $M^2$ is at least one bivalent metal atom selected from the group consisting of Be, Mg, Ca, Sr, Ba, Zn, Cd, Cu and Ni; the $M^3$ is at least one tervalent metal atom selected from the group consisting of Sc, Y, La, Ce, Pr, Nd, Pm, Sm, Eu, Gd, Tb, Dy, Ho, Er, Tm, Yb, Lu, Al, Ga and In; each of the X, X' and X" is at least one halogen atom selected from the group consisting of F atom, Cl atom, Br atom and I atom; the A is at least one metal atom selected from the group consisting of Eu, Tb, In, Ce, Tm, Dy, Pr, Ho, Nd, Yb, Er, Gd, Lu, Sm, Y, Tl, Na, Ag, Cu and Mg; and each of the a, b and e represents a numeric value in a range of $0 \leq a < 0.5$, $0 \leq b < 0.5$ and $0 < e \leq 0.2$.

Further, particularly, the at least one photostimulable phosphor layer preferably contains a photostimulable phosphor including CsBr.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE INVENTION

Hereinafter, a first to third features of the present invention will be explained in detail as a first to third embodiments.

[First Embodiment]

The inventors have made various studies, and as a result, have found out a method for manufacturing a radiographic image conversion panel capable of obtaining a radiographic image conversion panel having good adhesive property (adhesiveness) of a photostimulable phosphor layer formed on a support by a vapor phase deposition method with the support, and having excellent luminance by controlling the temperature of the support at the time of vapor deposition at 50° C. to 150° C. and depositing phosphor raw materials on the support.

<<Method for Controlling Temperature of Support>>

As methods for controlling a support (hereinafter, also referred to as a "substrate") at the time of deposition at 50° C. to 150° C., the following methods can be given.

1) Method for Deposition at Low Speed

The substrate temperature can be controlled at 50° C. to 150° C. by depositing at low speed and controlling the increase of the substrate temperature according to heat of radiation from an evaporation source and heat of condensation of vapor.

2) Method for Depositing by Adjusting the Distance Between a Substrate and an Evaporation Source The substrate temperature can be controlled at 50° C. to 150° C. by adjusting the distance between the substrate and the evaporation source, and similar to the above-described 1), controlling the increase of the substrate temperature according to heat of radiation from the evaporation source and heat of condensation of vapor.

3) Method for Depositing by Setting an Evaporation Source Away from a Substrate Center (See Later-described FIGS. 2 and 4)

Figure 4:
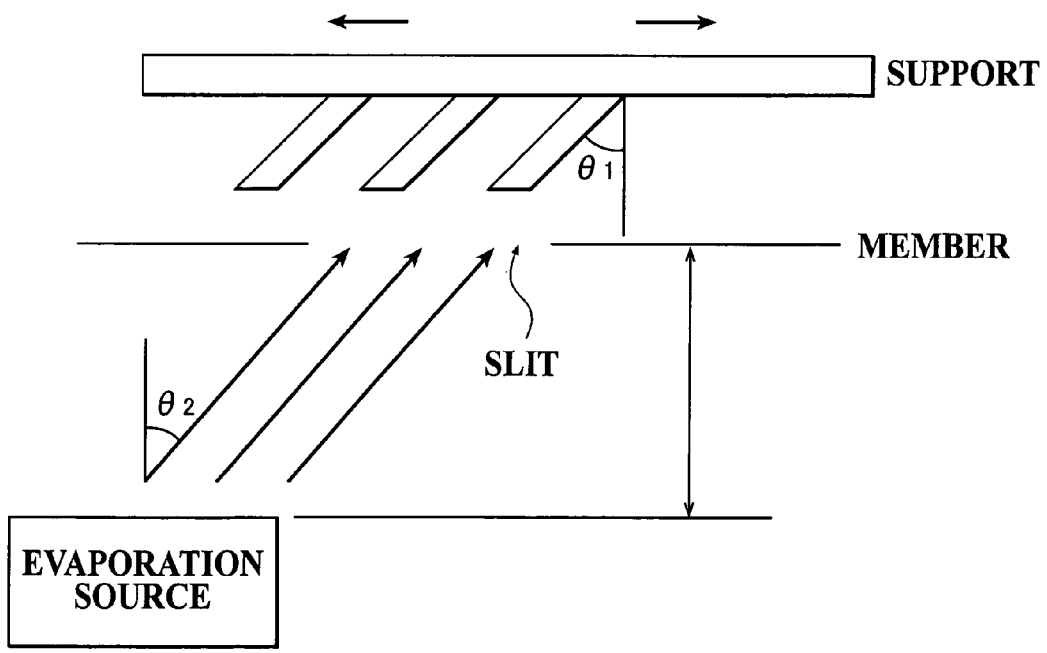
FIG. 4 is for showing the first embodiment of the present invention, and is a schematic view showing an example of a method for preparing the photostimulable phosphor layer on the support according to deposition.

The heat of radiation from the evaporation source can be adjusted by adjusting $\theta_1$ and $\theta_2$ in FIG. 4, and the substrate temperature can be controlled at 50° C. to 150° C.

4) Method for Depositing by Adjusting the Output of a Heat Lamp and Controlling the Substrate Temperature at 50° C. to 150° C.

5) Method for Depositing by Cooling a Substrate

The substrate temperature can be controlled at 50° C. to 150° C. by discharging cooling water, refrigerant gas or the like into a substrate holder, disposing a substrate to contact closely to the substrate holder, and by cooling and adjusting the substrate temperature.

6) Method for Depositing Intermittently (See Later-described FIG. 4)

A member having a slit (opening portion for vapor flow passage) is disposed under a substrate, and the substrate above the member is carried from side to side parallel to the member. Then, the substrate temperature can be controlled at 50° C. to 150° C. by adjusting heat of radiation from the evaporation source.

In addition, the method for controlling the substrate temperature at 50° C. to 150° C. at the time of deposition is not limited to the above-described methods. The above-described methods may also be combined.

In addition, although the reason is not clear, in forming a deposited film according to a vapor phase deposition, when the film is formed by depositing at a temperature of a support above 150° C., especially when a photostimulable phosphor layer having CsBr:Eu is used, since the expansion coefficient of CsBr is large, the photostimulable phosphor layer peels off and the adhesiveness of the phosphor layer with the support becomes worse. Further, when the film is formed by depositing at a temperature of a support below 50° C., there is no problem in adhesiveness, however, a problem such that luminance deteriorates occurs.

<<Photostimulable Phosphor Layer>>

The photostimulable phosphor layer according to the present invention will be explained.

As the photostimulable phosphor used in the photostimulable phosphor layer according to the present invention, the photostimulable phosphor having a composition represented by the following Formula (1) is preferably used, and CsBr is more preferable.

$$M^1X.aM^2X'_2.bM^3X''_3:eA \qquad (1)$$

In the formula, $M^1$ represents at least one kind of alkali metal selected from the group consisting of Li, Na, K, Rb and Cs; $M^2$ represents at least one kind of bivalent metal atom selected from the group consisting of Be, Mg, Ca, Sr, Ba, Zn, Cd and Ni; $M^3$ represents at least one kind of tervalent metal selected from the group consisting of Sc, Y, La, Ce, Pr, Nd, Pm, Sm, Eu, Gd, Tb, Dy, Ho, Er, Tm, Yb, Lu, Al, Ga and In; and each of X, X' and X" represents at least one kind of halogen selected from the group consisting of F, Cl, Br and I. The character A is at least one kind of metal selected from the group consisting of Eu, Tb, In, Ga, Cs, Ce, Tm, Dy, Pr, Ho, Nd, Yb, Er, Gd, Lu, Sm, Y, Tl, Na, Ag, Cu and Mg. The characters a, b and e represent numeric values in a range of $0 \leq a < 0.5$, $0 \leq b < 0.5$ and $0 < e \leq 0.2$, respectively.

In the photostimulable phosphor represented by Formula (1), as for $M^1$, at least one kind of alkali metal selected from the group consisting of K, Rb and Cs is preferable, and Cs atom is further preferable.

In the photostimulable phosphor represented by Formula (1), as for X, X' and X", Br or I is preferable.

In the photostimulable phosphor represented by Formula (1), as for $M^2$, at least one kind of bivalent metal atom selected from the group consisting of Be, Mg, Ca, Sr and Ba is preferable.

In the photostimulable phosphor represented by Formula (1), as for $M^3$, at least one kind of tervalent metal selected from the group consisting of Y, La, Ce, Sm, Eu, Gd, Lu, Al, Ga and In is preferable.

In the photostimulable phosphor represented by Formula (1), the characters a, b and e are preferably $0 \leq a < 0.01$, $0 \leq b < 0.01$ and $0 < e \leq 0.1$, respectively.

In the photostimulable phosphor represented by Formula (1), as for A, at least one kind of metal selected from the group consisting of Eu, Ce, Sm, Tl and Na is preferable, and Eu is particularly preferable.

Among the photostimulable phosphors represented by Formula (1), CsBr is particularly preferable to be used.

The photostimulable phosphor having a composition represented by CsBr has large X-ray absorption, and further highly sensitivity is enabled. Thereby, both high sensitivity and high sharpness can be achieved by controlling precisely the columnar crystals and forming the photostimulable phosphor.

With respect to manufacturing of the above-described photostimulable phosphor represented by Formula (1) and/or CsBr, the materials disclosed in Japanese Patent Application Publications Nos. Hei 7-84589, Hei 7-74334, Hei 7-84591, Hei 5-1475 and the like can be used for manufacturing of phosphor.

<<Method for Manufacturing Photostimulable Phosphors>>

The photostimulable phosphor represented by Formula (1) of the present invention is manufactured, for example, by a manufacturing method described in the following.

As phosphor raw materials, for example, (a) At least one or two or more kinds of compounds selected from the group consisting of NaF, NaCl, NaBr, NaI, KF, KCl, KBr, KI, RbF, RbCl, RbBr, RbI, CsF, CsCl, CsBr and CsI are used.

(b) At least one or two ore more kinds of compounds selected from the group consisting of $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2.2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, CuI, $NiF_2$, $NiCl_2$, $NiBr_2$ and $NiI_2$ are used.

(c) At least one or two or more kinds of compounds selected from the group consisting of $AlCl_3$, $GaBr_3$ and $InCl_3$ are used.

(d) As an activator portion raw material, a compound having a metal atom selected from the group consisting of Eu, Tb, In, Cs, Ce, Tm, Dy, Pr, Ho, Nd, Yb, Er, Gd, Lu, Sm, Y, Tl, Na, Ag, Cu, Mg and the like are used.

The phosphor raw materials in the above-described (a) to (d) are weighed so as to be in a mixed composition of the above-described numeric range, and are mixed sufficiently by using a mortar, ball mill, mixer mill or the like.

In addition, once after calcining is performed with the above-described calcining conditions, the calcined material is taken out from the electric furnace to be crushed. Thereafter, the powders of the calcined material are again filled in the heatproof container, are put into the electric furnace, and re-calcining is performed with the same calcining conditions as above. Accordingly, the luminescence luminance can be made higher. Further, in case of cooling the calcined material from the calcining temperature to room temperature, a desired phosphor can also be obtained by taking the calcined material out of the electric furnace and cooling it in air. However, it may be cooled under remaining mild reducing atmosphere or neutral atmosphere, which is the same as at the time of calcining. Further, the luminescence luminance of the obtained phosphor according to stimulation can be made further higher by making the calcined material move from a heating section to a cooling section in the electric furnace, and by cooling it rapidly under mild reducing atmosphere, neutral atmosphere or mild oxidizing atmosphere.

It is an essential feature that at least one photostimulable phosphor layer according to the present invention is formed by a vapor phase deposition method, and the shape of the formed photostimulable phosphor is preferable to have a columnar crystal structure. Further, each columnar crystal preferably has a crystal structure such that each columnar crystal is independent from each other and is crystal grown by being separated for a predetermined distance. Here, as a method for growing each crystal to independently have a columnar crystal structure, for example, the method disclosed in Japanese Patent No. 2899812 can be referred as an example.

<<Preparation of Photostimulable Phosphor Layer According to Vapor Phase Deposition Method>>

As methods for performing vapor phase growth (vapor phase deposition method) of a photostimulable phosphor and growing the phosphor in a columnar crystal, the later-described deposition method, sputtering method, CVD method, ion plating method and the like are preferably used.

A photostimulable phosphor layer having an independent and elongated columnar crystal structure can be obtained by supplying vapor or raw materials of a photostimulable phosphor (it is also referred to as "photostimulable phosphor raw materials") at a specific incident angle on a support and by performing vapor phase growth of a crystal (which is called vapor phase deposition method). Further, the columnar crystal can be grown at a growth angle approximately half of the incident angle of vapor flow of the photostimulable phosphor at the time of deposition.

As the method for supplying the vapor flow of a photostimulable phosphor or photostimulable phosphor raw materials at a certain incident angle against the support face, a method for arranging such that the support and the crucible in which the evaporation source is charged are inclined against each other, a method for controlling such that the support and the crucible are arranged parallel to each other and only the diagonal component is deposited on the support from the evaporation face of the crucible, in which the evaporation source is charged, by slits or the like, or the like may be used.

In these cases, the minimal distance between the support and the crucible is preferable to be set approximately 10 cm to 60 cm in accordance with the average range of the photostimulable phosphor.

In order to enhance the modulation transfer function (MTF) in the photostimulable phosphor layer including columnar crystals, the thickness of the columnar crystals (it is a mean value of diameters of cross sectional area of each columnar crystal when the columnar crystals are observed in a plane parallel to the support converted into a circle, and is calculated by a microphotograph including at least 100 or more columnar crystals in view) is preferably from 1 µm to 50 µm, and more preferably, from 1 µm to 30 µm. That is, when the columnar crystals are thinner than 1 µm, the MTF deteriorates since the photostimulated excitation light is scattered according to the columnar crystals. When the columnar crystals are 50 µm or more, the directivity of the photostimulated excitation light deteriorates, and thereby, the MTF deteriorates.

Further, the void among each columnar crystal is preferably not more than 30 µm, and more preferably, not more than 5 µm. That is, when the void is above 30 µm, the filling factor of phosphors in the photostimulable phosphor layer becomes low, and the sensitivity deteriorates.

Hereinafter, the deposition method, sputtering method and CVD method preferably used as the vapor phase deposition method (also referred to as "vapor phase method") will be explained.

(Deposition Method)

In the deposition method, the support is placed in a deposition apparatus, and air in the deposition apparatus is discharged so as to obtain a degree of vacuum of approximately $1.0 \times 10^{-4}$ Pa. Next, at least one of the photostimulable phosphors is heated and evaporated by a method such as resistive heating, electron beam method or the like, and the photostimulable phosphor on the support is piled in a desired thickness on the surface of the support.

As a result, the photostimulable phosphor layer without containing a binder is formed. However, in the above-described deposition step, it is possible to form the photostimulable phosphor layer in plural numbers. Further, in the above-described deposition step, it is possible to perform the deposition by using a plurality of resistance heaters or electron beams.

Further, in the deposition method, it is possible to deposit the photostimulable phosphor raw materials by using a plurality of resistance heaters or electron beams and to form the photostimulable phosphor layer simultaneously by synthesizing the aimed photostimulable phosphor on the support. After the deposition is terminated, a protective layer is provided on the side of the photostimulable phosphor layer opposite from the support side according to need. Thereby, a radiographic image conversion panel of the present invention is manufactured. In addition, it may be a procedure such that the support is provided after the photostimulable phosphor layer is formed on the protective layer. Moreover, in the deposition method, the material to be deposited may be cooled or heated at the time of deposition according to need. Further, heat treatment may be performed to the photostimulable phosphor layer after the deposition is terminated.

Further, the throttle of the opening of the air-discharging valve of the deposition apparatus may be adjusted, and gas such as nitrogen gas, argon gas or the like may be introduced to perform deposition at degree of vacuum of $1 \times 10^{-4}$ Pa to 1 Pa. Further, reactive deposition for depositing by introducing gas such as $O_2$, $H_2$ or the like may be performed according to need.

(Sputtering Method)

In the sputtering method, similar to the deposition method, the support is placed in a sputtering apparatus, and air in the sputtering apparatus is discharged so as to obtain a degree of vacuum of approximately $1.333 \times 10^{-4}$ Pa. Next, inert gas such as Ar, Ne or the like is introduced into the sputtering apparatus as gas for sputtering, and a gas pressure is made to $1.333 \times 10^{-1}$ Pa. Next, sputtering is performed obliquely by using the photostimulable phosphors as targets, and the photostimulable phosphors are piled obliquely in a desired thickness on the surface of the support.

In this sputtering step, similar to the deposition method, it is possible to form the photostimulable phosphor layer in plural numbers. It is also possible to form the photostimulable phosphor layer by simultaneously or sequentially sputtering the above-described targets, respectively. Further, in the sputtering method, it is possible to form the aimed photostimulable phosphor layer on the support by using a plurality of photostimulable phosphor raw materials as targets and simultaneously or sequentially sputtering these targets. Reactive sputtering also may be performed by introducing gas such as $O_2$, $H_2$ or the like according to need. Furthermore, in the sputtering method, the material to be deposited may be cooled or heated at the time of sputtering according to need. Further, heat treatment may be performed to the photostimulable phosphor layer after the sputtering is terminated.

(CVD Method)

The CVD method is for obtaining the photostimulable phosphor layer without containing a binder on the support by decomposing an organometallic compound containing the aimed photostimulable phosphor or photostimulable phosphor raw materials according to energy such as heat, high-frequency power or the like. It becomes possible to perform vapor phase growth the photostimulable phosphor layer into individual and elongated columnar crystals to have specific slop against the normal line direction of the support.

Further, the growth rate of the photostimulable phosphor layer in the above-described vapor phase growth is preferably between 0.05 µm/min and 300 µm/min. When the growth rate is less than 0.05 µm/min, the productivity of the radiographic image conversion panel of the present invention becomes low, so that it is not preferable. Further, when the growth rate exceeds 300 µm/min, it becomes difficult to control the growth rate, so that it is not preferable.

In case of obtaining a radiographic image conversion panel by the above-mentioned vacuum deposition method, sputtering method or the like, the bulk density of the photostimulable phosphor can be increased since no binder exists. Therefore, a radiographic image conversion panel preferable in sensitivity and resolving power can be obtained, so that it is preferable.

The crucible for performing deposition changes according to thermal process such as resistance heating process, halogen heating process, EB (electron beam) process or the like used as a deposition process.

The layer thickness of the photostimulable phosphor layer differs according to the intended use of the radiographic image conversion panel or according to the types of the photostimulable phosphor. However, from viewpoint of obtaining the above-described effects of the present invention, 50 µm to 1 mm is preferable, and more preferably, 50 µm to 800 µm.

Next, formation of the photostimulable phosphor layer of the present invention will be explained by using FIGS. 1 and 2.

Figure 1:
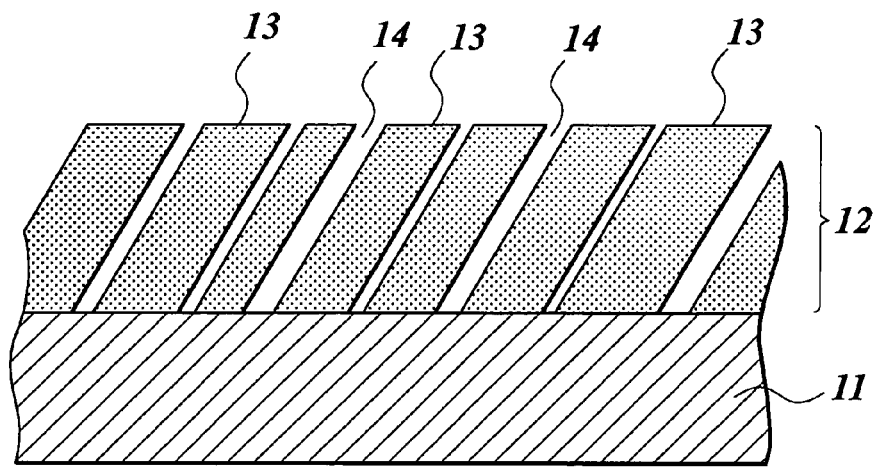
FIG. 1 is for showing a first embodiment of the present invention, and is a cross sectional view showing an example of a photostimulable phosphor layer having columnar crystals formed on a support.

FIG. 1 is a cross sectional view schematically showing an example of a photostimulable phosphor layer having columnar crystals formed on a support by using the above-described vapor phase growth. The numeral 11 shows a support, 12 shows a photostimulable phosphor layer, and 13 shows columnar crystals forming the photostimulable phosphor layer. In addition, the numeral 14 shows voids formed among columnar crystals.

Figure 2:
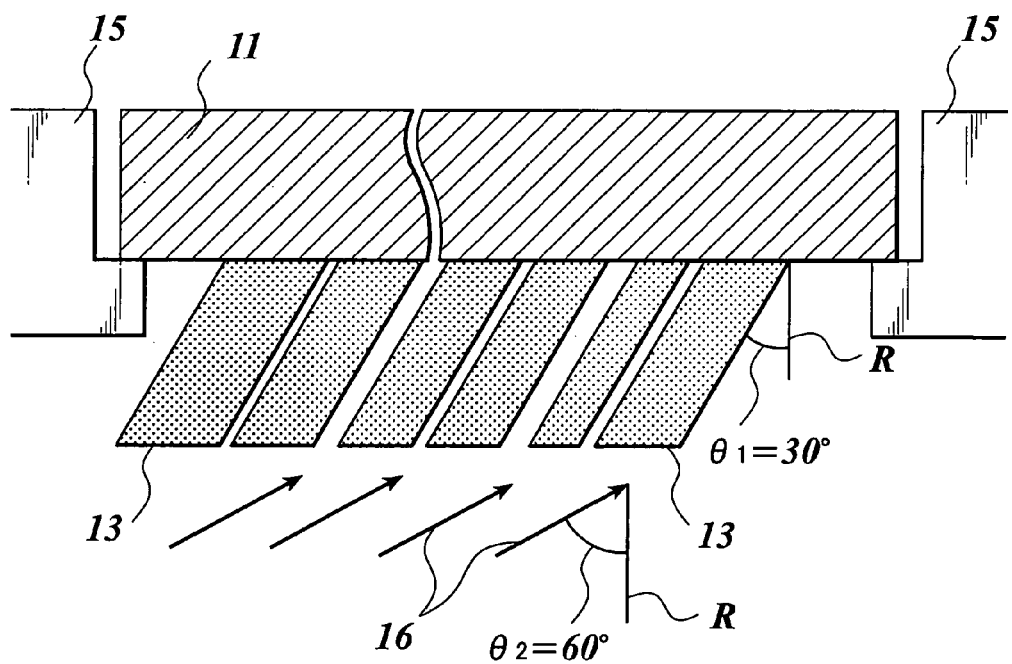
FIG. 2 is for showing the first embodiment of the present invention, and is a view showing a condition of forming the photostimulable phosphor layer on the support according to a deposition method.

FIG. 2 is a view showing a condition of forming the photostimulable phosphor layer on the support according to deposition (the temperature of the support at the time of deposition is controlled at 50° C. to 150° C.). When the incident angle of photostimulable phosphor vapor flow 16 against the normal line direction (R) of the support face is made $\theta_2$ (it is incident at 60° in the figure), the angle of the columnar crystals to be formed against the normal line direction (R) of the support face is represented by $\theta_1$ (30° in the figure). In the present invention, this angle is adjusted and the temperature of the support is controlled at 50° C. to 150° C. at the time of deposition to form a phosphor layer having columnar crystal phosphors.

Since the photostimulable phosphor layer formed on the support in such a manner does not contain a binder, it is excellent in directivity. Therefore, it is possible to make the layer thickness thicker than that of a radiographic image conversion panel having a dispersion type photostimulable phosphor layer in which photostimulable phosphors are dispersed in a binder. Furthermore, the sharpness of images is excellent since scattering of photostimulated excitation light in the photostimulable phosphor layer is reduced, and it is possible to improve the adhesiveness of the phosphor layer with the support.

Further, a filling material such as binder or the like may be filled in voids among columnar crystals. Further, materials of reinforcement of the photostimulable phosphor layer, materials having high optical absorption, materials having high optical reflectance, and the like may be filled. Thereby, a reinforcement effect can be obtained, and moreover, it is effective to reduce optical dispersion in the transverse direction of the photostimulated excitation light inputted in the photostimulable phosphor layer.

The materials having high reflectance means the ones having high reflectance in response to the photostimulated excitation light (500 nm to 900 nm, particularly, 600 nm to 800 nm). For example, metals such as aluminum, magnesium, silver, indium and the like, white pigments and color materials from green to red region can be used. The white pigments can also reflect the photostimulated luminescence.

As the white pigments, for example, $TiO_2$ (anatase type, rutile type), MgO, $PbCO_3.Pb(OH)_2$, $BaSO_4$, $Al_2O_3$, M(II)FX (wherein M(II) is at least one atom selected from the group consisting of Ba, Sr and Ca, and X is Cl atom or Br atom), $CaCO_3$, ZnO, $Sb_2O_3$, $SiO_2$, $ZrO_2$, lithopone ($BaSO_4.ZnS$), magnesium silicate, basic lead silicosulfate, basic lead phosphate, aluminum silicate and the like can be given.

These white pigments have strong covering power and large refractive index. Therefore, the photostimulated luminescence can be scattered easily by reflecting or refracting light, so that it is possible to remarkably improve the sensitivity of the obtained radiographic image conversion panel.

Further, as the materials having high optical absorption, for example, carbon black, chromium oxide, nickel oxide, iron oxide and the like, and color material of blue can be used. Among these, carbon black also absorbs the photostimulated luminescence.

Further, the color materials may be either organic or inorganic color materials.

As the organic system color materials, for example, Zabon Fast Blue 3G (produced by Hoechst), Estrol Brill Blue N-3RL (produced by Sumitomo Chemical), D & C Blue No. 1 (produced by National Aniline), Spirit Blue (produced by Hodogaya Chemical), Oil Blue No. 603 (produced by Orient), Kiton Blue A (produced by Chiba-Geigy), Aizen Catiron Blue GLH (produced by Hodogaya Chemical), Lake Blue AFH (produced by Kyowa Sangyo), Primocyanine 6GX (produced by Inabata & Co.), Brill Acid Green 6BH (produced by Hodogaya Chemical), Cyan Blue BNRCS (produced by Toyo Ink), Lionoil Blue (produced by Toyo Ink) and the like are used.

Further, organic system metal complex salt color materials such as color index Nos. 24411, 23160, 74180, 74200, 22800, 23154, 23155, 24401, 14830, 15050, 15760, 15707, 17941, 74220, 13425, 13361, 13420, 11836, 74140, 74380, 74350, 74460 and the like can be given.

As the inorganic system color materials, for example, permanent blue, cobalt blue, cerulean blue, chromium oxide, organic pigments such as $TiO_2$—ZnO—Co—NiO system pigments and the like can be given.

Further, as photostimulable phosphors according to the radiographic image conversion panel of the present invention, for example, phosphors represented by Formula of $BaSO_4:A_x$ disclosed in Japanese Patent Application Laid-Open Publication No. Sho 48-80487; phosphors represented by $MgSO_4:A_x$ disclosed in Japanese Patent Application Laid-Open Publication No. Sho 48-80488; phosphors represented by $SrSO_4:A_x$ disclosed in Japanese Patent Application Laid-Open Publication No. Sho 48-80489; phosphors disclosed in Japanese Patent Application Laid-Open Publication No. Sho 51-29889, in which at least one of Mn, Dy and Tb is added to $Na_2SO_4$, $CaSO_4$, $BaSO_4$ or the like; phosphors disclosed in Japanese Patent Application Laid-Open Publication No. Sho 52-30487, such as BeO, LiF, $MgSO_4$, $CaF_2$ and the like; phosphors disclosed in Japanese Patent Application Laid-Open Publication No. Sho 53-39277, such as $Li_2B_4O_7:Cu,Ag$ and the like; phosphors disclosed in Japanese Patent Application Laid-Open Publication No. Sho 54-47883, such as $Li_2O(Be_2O_2)_x:Cu,Ag$ and the like; phosphors represented by SrS:Ce,Sm, SrS:Eu,Sm, $La_2O_2S:Eu,Sm$ and (Zn,Cd)S:Mnx disclosed in U.S. Pat. No. 3,859,527 and the like can be given. Moreover, ZnS:Cu,Pb phosphors disclosed in Japanese Patent Application Laid-Open Publication No. Sho 55-12142; barium aluminate phosphors whose Formula is represented by $BaO.xAl_2O_3$:Eu; and alkaline earth metal silicate system phosphors whose Formula is represented by $M(II)O.xSiO_2:A$ can be given.

Further, alkaline earth fluorohalide phosphors disclosed in Japanese Patent Application Laid-Open Publication No. Sho 55-12143 and represented by Formula of $(Ba_{1-x-y}Mg_xCa_y)F_x:Eu^{2+}$; phosphors disclosed in Japanese Patent Application Laid-Open Publication No. Sho 55-12144 and represented by Formula of LnOX:xA; phosphors disclosed in Japanese Patent Application Laid-Open Publication No. Sho 55-12145 and represented by Formula of $(Ba_{1-x}M(II)_x)F_x:yA$; phosphors disclosed in Japanese Patent Application Laid-Open Publication No. Sho 55-84389 and represented by Formula of BaFX:xCe,yA; rear-earth element-activating bivalent metal fluorohalide phosphors disclosed in Japanese Patent Application Laid-Open Publication No. Sho 55-160078 and represented by Formula of M(II)FX.xA:yLn; phosphors represented by Formula of ZnS:A, CdS:A and (Zn,Cd)S:A,X; phosphors disclosed in Japanese Patent Application Laid-Open Publication No. Sho 59-38278 and represented by either of the following Formulas:

$xM_3(PO_4)_2 \cdot NX_2:yA$ $xM_3(PO_4)_2:yA;$ phosphors disclosed in Japanese Patent Application Laid-Open Publication No. Sho 59-155487 and represented by either of the following Formulas:

$nReX_3 \cdot mAX'_2:xEu$ $nReX_3 \cdot mAX'_2:xEu, ySm;$ alkali halide phosphors disclosed in Japanese Patent Application Laid-Open Publication No. Sho 61-72087 and represented by the following Formula:

$M(I)X \cdot aM(II)X'_2 \cdot bM(III)X''_3:cA;$ bismuth-activating alkali halide phosphors disclosed in Japanese Patent Application Laid-Open Publication No. Sho 61-228400 and represented by Formula of M(I)X:xBi, and the like can be given.

Particularly, the alkali halide phosphors are preferable since columnar photostimulable phosphor layer is easily formed according to methods such as deposition, sputtering and the like.

Further, as mentioned above, the CsBr system phosphors among the alkali halide phosphors are preferable since they have high luminance and high image quality.

<<Support>>

The support according to the present invention will be explained.

As the support, various polymeric materials, glasses, ceramics, metals, carbon fibers, composite materials including carbon fibers, and the like are used. For example, plate glasses such as quartz, borosilicate, chemically-strengthened glasses, glass ceramics and the like, ceramics such as alumina, silicon nitride and the like, plastic films such as cellulose acetate film, polyester film, polyethylene terephthalate film, polyamide film, polyimide film, triacetate film, polycarbonate film and the like, metal sheets such as aluminum sheet, iron sheet, copper sheet and the like, or metal sheets having a coating layer of hydrophilic fine particles are preferable.

The surface of these supports may be smooth, or may be mat in order to improve the adhesiveness with the photostimulable phosphor layer. Further, in the present invention, in order to improve the adhesiveness of the support with the photostimulable phosphor layer, an adhesive layer may be provided on the surface of the support beforehand according to need.

(Thickness of Support)

The thickness of these supports differs according to the materials and the like of the support to be used. However, generally, it is between 80 μm and 8000 μm. From viewpoint of handling, it is preferably between 80 μm and 5000 μm, further preferably, between 80 μm and 2000 μm, and most preferably, between 80 μm and 1000 μm.

Further, the photostimulable phosphor layer of the present invention may have a protective layer.

The protective layer may be formed by applying application liquid for protective layer directly on the photostimulable phosphor layer, or a protective layer formed separately beforehand may be adhered on the photostimulable phosphor layer. Besides, a procedure such that the photostimulable phosphor layer is formed on a protective layer formed separately beforehand may be carried out.

As the material of the protective layer, a regular material for protective layer such as cellulose acetate, nitrocellulose, polymethyl methacrylate, polyvinyl butyral, polyvinyl formal, polycarbonate, polyester, polyethylene terephthalate, polyethylene, polyvinylidene chloride, nylon, polytetrafluoroethylene, polytrifluoro-ehtylene chloride, tetrafluoroethylene-hexafluoropropylene copolymer, vinylidene chloride-vinyl chloride copolymer, vinylidene chloride-acrylonitrile copolymer or the like is used. Besides these, a transparent glass substrate can be used as a protective layer.

Further, the protective layer may be formed by laminating inorganic materials such as SiC, $SiO_2$, SiN, $Al_2O_3$ and the like by deposition method, sputtering method or the like.

The layer thickness of these protective layers is preferably between 0.1 μm and 2000 μm.

<<Structure of Radiographic Image Conversion Panel>>

Next, the structure of the radiographic image conversion panel of the present invention will be explained.

Figure 3:
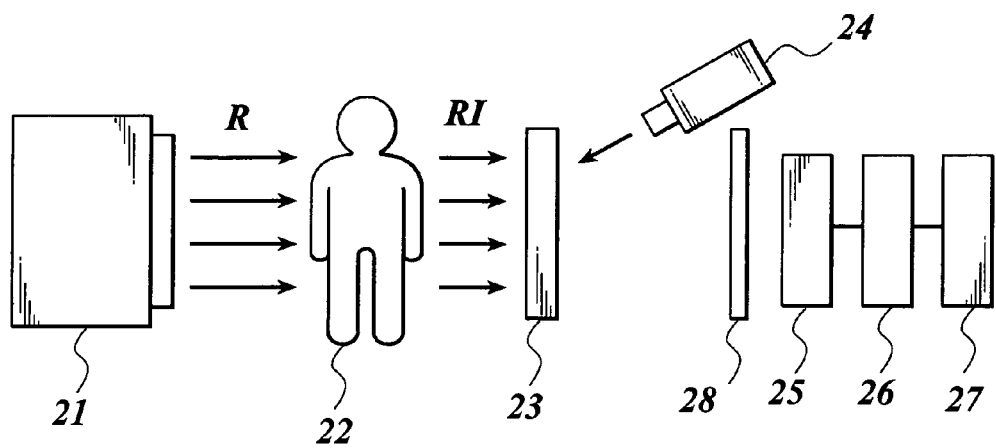
FIG. 3 is for showing the first embodiment of the present invention, and is a schematic view showing an example of a structure of a radiographic image conversion panel.

FIG. 3 is a schematic view showing an example of a structure of a radiographic image conversion panel of the present invention.

In FIG. 3, the numeral 21 is a radiation generator, 22 is a subject, 23 is a radiographic image conversion panel having a visible light or infrared light photostimulable phosphor layer containing a photostimulable phosphor, 24 is a photostimulated excitation light source for discharging a radiographic latent image of the radiographic image conversion panel 23 as photostimulated luminescence, 25 is a photoelectric conversion device for detecting the photostimulated luminescence discharged by the radiographic image conversion panel 23, 26 is an image reproducing device for reproducing the photoelectric conversion signal detected by the photoelectric conversion device 25 as an image, 27 is an image display device for displaying the reproduced image, and 28 is a filter for transmitting only the light discharged by the radiographic image conversion panel 23.

In addition, FIG. 3 is an example of the case of obtaining a radiographic transmitted image of the subject 22. However, when the subject 22 itself emits radioactive rays, the radiation generator 21 is not required particularly.

Further, from the photoelectric conversion device 25, they are not limited to the above if it is possible to somehow reproduce optical information from the radiographic image conversion panel 23.

As shown in FIG. 3, when the subject 22 is disposed between the radiation generator 21 and the radiographic image conversion panel 23, and a radioactive ray R is irradiated, the radioactive ray R transmits through the subject 22 in accordance with changes of radiation transmittance in each part of the subject 22, and its transmitted image RI (that is, an image of strength and weakness of radioactive ray) enters into the radiographic image conversion panel 23.

The incident transmitted image RI is absorbed to the photostimulable phosphor layer of the radiographic image conversion panel 23, and thereby, electrons and/or positive holes whose number is proportional to the radiation dose absorbed in the photostimulable phosphor layer are generated, and these are accumulated at the trap level of the photostimulable phosphor.

That is, a latent image accumulating energy of the radiographic transmitted image is formed. Next, the latent image is excited with light energy and is actualized.

Further, the electrons and/or positive holes accumulated at the trap level are removed by irradiating a light in visible or infrared region to the photostimulable phosphor layer according to the photostimulated excitation light source 24, and the accumulated energy is discharged as photostimulated luminescence.

The strength and weakness of the discharged photostimulated luminescence are proportional to the number of the accumulated electrons and/or positive holes, that is, the strength and weakness of the radiation energy absorbed in the photostimulable phosphor layer of the radiographic image conversion panel 23. This optical signal is, for example, converted into an electronic signal by the photoelectric conversion device 25 such as photomultiplier or the like, reproduced as an image by the image reproducing device 26, and the image is displayed by the image display device 27.

It becomes more effective if the image processing device 26 which can not only reproduce the electronic signal as an image signal, but also can perform so-called image processing, arithmetic of image, storing and saving of image, and the like is used.

Further, when exciting the light energy, it is required to separate the reflected light of the photostimulated excitation light and the photostimulated luminescence discharged from the photostimulable phosphor layer, and the sensitivity of a photoelectric conversion device 25, which receives luminescence discharged from the photostimulable phosphor layer, in response to the light energy generally having short wavelength of not more than 600 nm becomes high. From these reasons, the photostimulated luminescence emitted from the photostimulable phosphor layer is desirable to have a spectrum distribution in a short wavelength region.

The luminescence wavelength band of the photostimulable phosphor according to the present invention is between 300 nm and 500 nm, on the other hand, the photostimulated excitation wavelength band is between 500 nm and 900 nm, so that it satisfies the above-described conditions. However, recently, miniaturization of diagnostic apparatus proceeds, and a semiconductor laser whose excitation wavelength used for reading images of a radiographic image conversion panel is high power and which is easy to be downsized is preferable. The wavelength of the semiconductor laser is 680 nm, and the photostimulable phosphor incorporated in the radiographic image conversion panel of the present invention shows extremely good sharpness when an excitation wavelength of 680 nm is used.

That is, the photostimulable phosphor according to the present invention shows luminescence having a main peak of not more than 500 nm, is easy to separate the photostimulated excitation light, and moreover, corresponds well with the spectral sensitivity of a receiver. Therefore, it can receive lights effectively, and as a result, the sensitivity of an image reception system can be enhanced.

As the photostimulated excitation light source 24, a light source including the photostimulated excitation wavelength of the photostimulable phosphor used in the radiographic image conversion panel 23 is used. Particularly, since the optical system becomes simple when a laser beam is used, and further, the photostimulated excitation light intensity can be made large, the photostimulated luminescence efficiency can be improved, so that further preferable results can be obtained.

As a laser, for example, there are metal vapor lasers and the like, such as He—Ne laser, He—Cd laser, Ar ion laser, Kr ion laser, $N_2$ laser, YAG laser and its second harmonic, ruby laser, semiconductor laser, various dye laser, copper vapor laser and the like. Usually, a continuous oscillation laser such as He—Ne laser, Ar ion laser or the like is desirable. However, a pulse oscillation laser can be used if the scanning time of one pixel of the panel is synchronized with the pulse.

Further, when the lights are separated by utilizing delay of luminescence without using the filter 28, as disclosed in Japanese Patent Laid-Open Publication No. Sho 59-22046, it is preferable to use a pulse oscillation laser rather than modulating by using a continuous oscillation laser.

Among the above-described various laser light sources, the semiconductor laser is small and cheap, and moreover, no modulator is required. Therefore, it is preferable to be used particularly.

As the filter 28, since it is for transmitting the photostimulated luminescence emitted from the radiographic image conversion panel 23 and for cutting the photostimulated excitation light, this is determined according to combination of the photostimulated luminescence wavelength of the photostimulable phosphor contained in the radiographic image conversion panel 23 and the wavelength of the photostimulated excitation light source 24.

For example, in case of combination preferable in practical use such that the photostimulated excitation wavelength is between 500 nm and 900 nm and the photostimulated luminescence wavelength is between 300 nm and 500 nm, a purple to blue glass filter such as C-39, C-40, V-40, V-42 or V-44 produced by Toshiba Corporation, 7-54 or 7-59 produced by Corning Corporation, BG-1, BG-3, BG-25, BG-37 or BG-38 produced by Spectrofilm Corporation, or the like can be used. Further, in case of using an interference filter, a filter having arbitrary properties can be selected and used to some extent. As the photoelectric conversion device 25, it may be anything if it is possible to convert changes of amount of light into changes of electronic signal, such as photoelectric tube, photomultiplier, photodiode, phototransistor, solar battery, photoconductive element and the like.

[Second Embodiment]

Further, the inventors have studied the above-described problems, and have found that a radiographic image conversion panel having at least one photostimulable phosphor layer formed on a support by a vapor phase deposition method through a step of heating one face of the support at the time of entering vapor flow including photostimulable phosphor raw materials into the support, and cooling the other face of the support shows high sensitivity and high sharpness.

That is, in the embodiment, as different from the first embodiment, the effects of the present invention are obtained by a concrete method of adjusting the temperature of the support. Here, since the other detailed descriptions are the same as those in the first embodiment, the descriptions are omitted, and only the different points will be explained.

<<Adjustment of Support Temperature, Setting of Surface Roughness of Support, Degree of Vacuum and the Like>>

The thickness of the columnar crystals forming the photostimulable phosphor layer according to the present invention is affected by the support temperature, degree of vacuum, incident angle of vapor flow and the like. Therefore, it is possible to prepare columnar crystals having the desired thickness by controlling these factors.

(a) Adjustment of Support Temperature

When forming a photostimulable phosphor layer by entering vapor flow including photostimulable phosphor raw materials on a support, it is essential to heat one face of the support and cool the other face of the support, in the present invention.

In the present invention, one face of the support is heated and the other face thereof is cooled. Thereby, the temperature of the whole support to be provided with a photostimulable phosphor layer can be adjusted in a predetermined range, and deviation from the predetermined range of temperature is made as small as possible. Accordingly, a radiographic image conversion panel which gives the effects (high sensitivity and high sharpness) described in the present invention can be obtained.

(Support Temperature)

Here, the support temperature is preferable to be adjusted at not more than 200° C., more preferably, not more than 150° C., and particularly, from 50° C. to 150° C. is preferable.

The setting of the above-described support temperature is preferable to form a photostimulable phosphor layer including the photostimulable phosphor represented by Formula (1), and particularly, it is preferable to form a photostimulable phosphor layer having a CsBr composition. It is found that the image quality of a radiographic image conversion panel having this photostimulable phosphor layer improves remarkably.

(Deviation of Support Temperature)

Further, as for the deviation of the support temperature at the time of formation of the photostimulable phosphor layer (here, deviation is represented by the deviation (±) from a predetermined temperature, and the predetermined temperature shows the temperature of the support set beforehand at the time of formation of the photostimulable phosphor layer), the deviation (±) from the predetermined temperature is preferably within ±20° C., further preferably, within ±10° C., and particularly preferably, within ±5° C.

(b) Degree of Vacuum

As for the degree of vacuum, it is preferable to be in a range of $5\times10^{-5}$ Pa to 1 Pa, and further preferably, in a range of $1\times10^{-4}$ Pa to 0.5 Pa.

(c) Surface Roughness Ra of Support (Value Defined in JIS B 0601)

As for the surface roughness of the support, the thickness of the columnar crystals is tend to become thin as the smoothness becomes high. Preferably, Ra is not more than 0.5, and further preferably, not more than 0.1.

<<Support Temperature Adjustment Section>>

Examples of the deposition (including sputtering, CVD and the like) apparatus according to the present invention having a section for adjusting the above-described support at a predetermined support temperature (the support is also referred to as "substrate") and a section for making the deviation of the support temperature at the time of formation of a photostimulable phosphor layer small will be explained by using FIGS. 5 to 7. In addition, examples of the deposition apparatus in earlier technology will be explained by using FIGS. 8 and 9.

Figure 8:
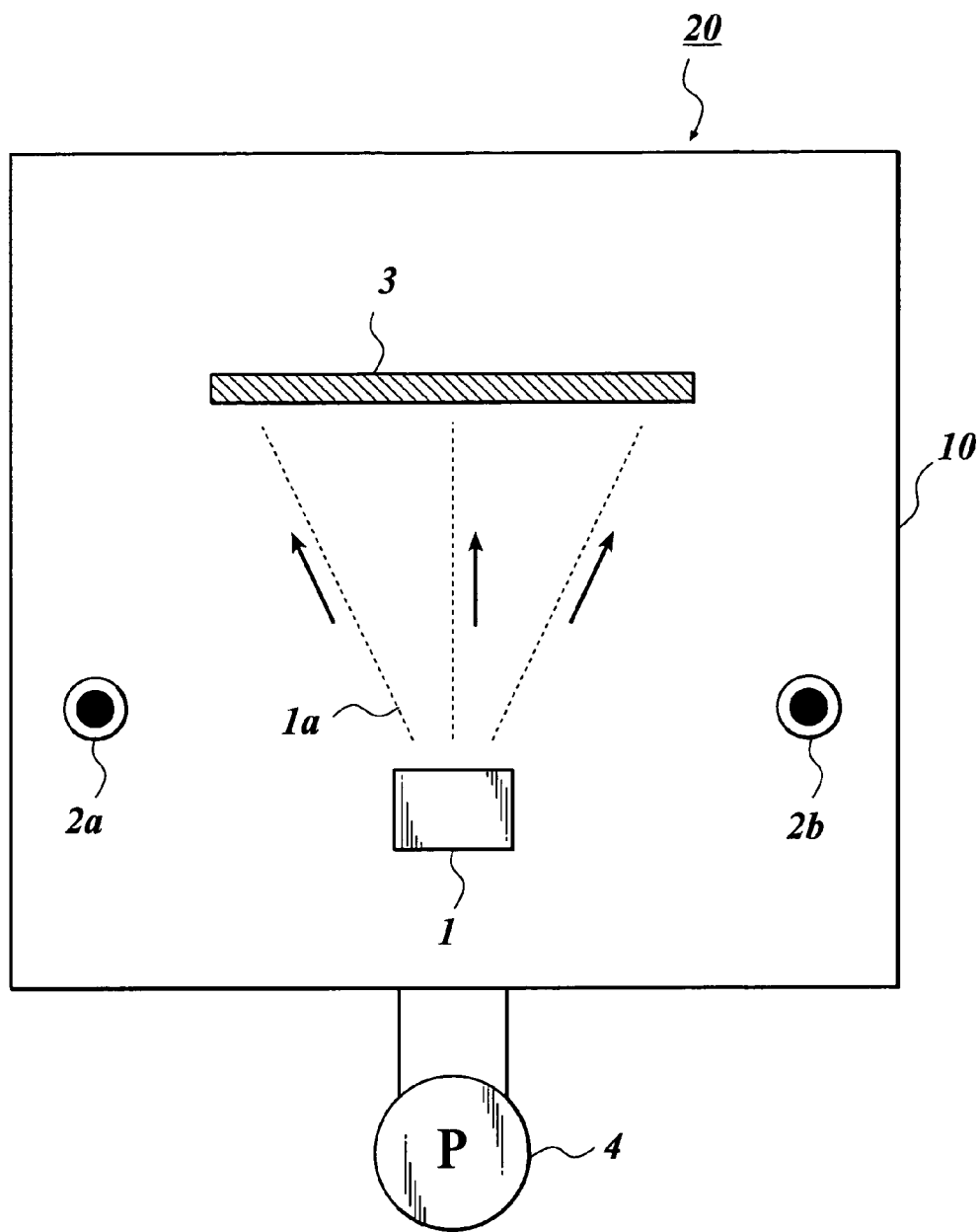
FIG. 8 is a view showing a frame format of an example of a deposition apparatus in earlier technology used in formation of a photostimulable phosphor layer.
Figure 9:
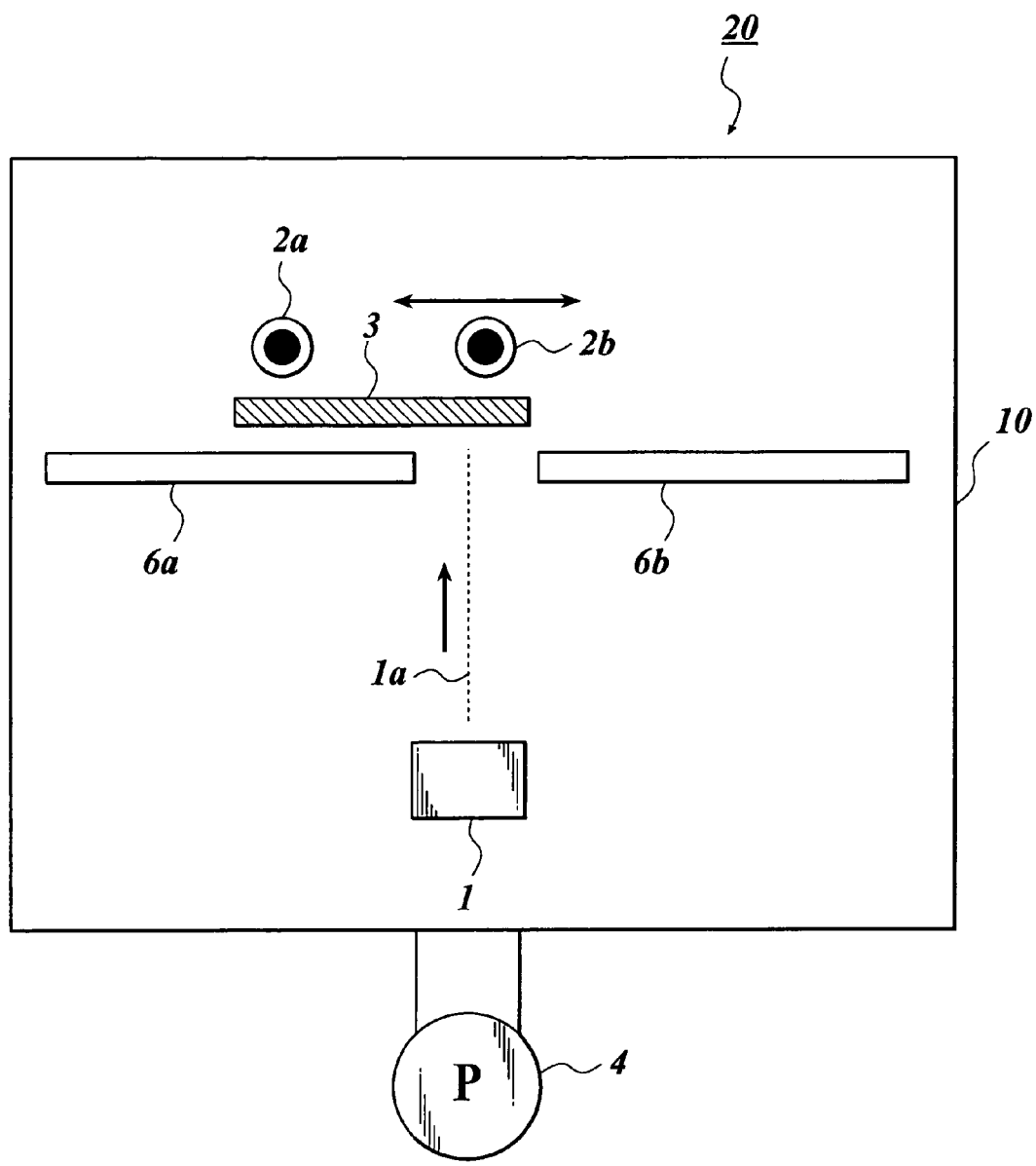
FIG. 9 is a view showing a frame format of another example of a deposition apparatus in earlier technology used in formation of a photostimulable phosphor layer.

In earlier technology, a deposition apparatus having a structure shown in FIG. 8 or 9 has been used generally in formation of a photostimulable phosphor layer using a vapor phase deposition method.

FIG. 8 is a view showing a frame format of an example of a deposition apparatus in earlier technology used in formation of a photostimulable phosphor layer.

In FIG. 8, heating members 2a and 2b for providing thermal energy to a support 3 (also referred to as "substrate") are disposed around an evaporation source 1 of each photostimulable phosphor raw material. Thermal energy is provided from the heating members 2a and 2b to vapor flow 1a of the photostimulable phosphor raw materials and the substrate 3, respectively. Thus, deposition is carried out. Further, at the time of deposition, the air in a vacuum chamber 10 is discharged by an air-discharging pump 4 from the vacuum chamber 10. Thus, the inside of the vacuum chamber 10 is adjusted under reduced pressure so as to be in atmosphere suitable for deposition.

FIG. 9 is a view showing a frame format of another example of a deposition apparatus in earlier technology used in formation of a photostimulable phosphor layer.

In FIG. 9, as different from FIG. 8, heating members 2a and 2b for providing thermal energy to a support 3 are disposed in the opposite side of the face of the support 3 where an evaporation source 1 is disposed.

Two slit-forming members 6a and 6b are disposed between the evaporation source 1 and the support 3. It is set so that only the vapor flow 1a passed through the slit formed by the slit-forming members 6a and 6b will be incident to the support 3. Moreover, a photostimulable phosphor layer (not shown) is formed on the support 3 by repeating right-and-left amplitude movement of the support 3.

However, as shown in FIGS. 8 and 9 in earlier technology, in case of the apparatus for forming a photostimulable phosphor layer by providing thermal energy to a support (substrate) 3, when heating the support 3 so as to be comparatively high temperature of 200° C. or more, temperature control of the support 3 can be carried out easily and precisely only by the heating members 2a and 2b. However, when performing temperature control of the set temperature of the support 3 at the time of deposition in a range of 200° C. or below, preferably, 150° C. or below, and more preferably, from 50° C. to 150° C., it becomes difficult to control the temperature because of the effects of heat of radiation from the evaporation source 1 or latent heat of vapor. Thereby, it becomes difficult to keep the support temperature at a predetermined temperature set beforehand, and further, variation in layer thickness distribution of a photostimulable phosphor layer is caused since deviation from the predetermined temperature is large. As a result, there is a problem that it gives rise to luminance decrease or deterioration of sharpness of a radiographic image conversion panel.

Hereinafter, each embodiment of the deposition apparatus used in formation of the photostimulable phosphor layer according to the present invention will be explained with reference to FIGS. 5 to 7.

Figure 5:
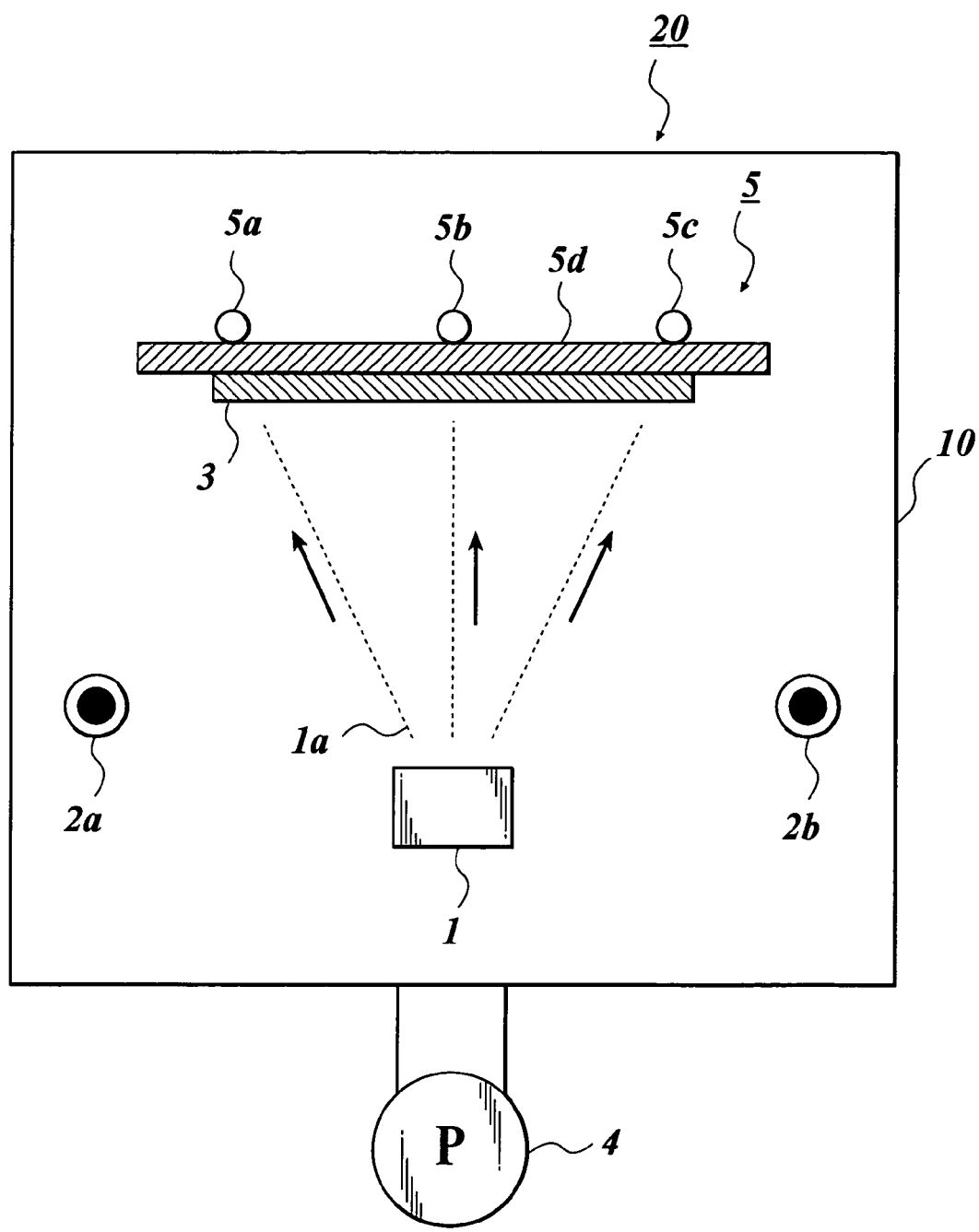
FIG. 5 is for showing a second embodiment of the present invention, and is a view showing a frame format of an example of a deposition apparatus used in formation of a photostimulable phosphor layer.

FIG. 5 is a view showing a frame format of an example of a deposition apparatus used in formation of the photostimulable phosphor layer according to the present invention.

In FIG. 5, heating members 2a and 2b for providing thermal energy are disposed around an evaporation source 1 in one face side of the support 3 (also referred to as "substrate"). In FIG. 5, the heating members 2a and 2b are disposed in two places, however, a plurality of heating members may be further disposed.

The structure of the heating members 2a and 2b are the same as in FIG. 8. However, the difference from FIG. 8 is that a cooling member 5 of the support 3 is provided on the other face side of the support 3.

The cooling member 5 comprises a support-cooling member 5d and cooling pipes 5a, 5b and 5c filled with cooling medium. In FIG. 5, the support-cooling member 5d is provided to the support 3 in a state closely contacted to the support 3.

The apparatus shown in FIG. 5 is for heating from the evaporation source side and cooling from the rear side of the support (substrate) 3. Therefore, the temperature of the crystal growth face of the photostimulable phosphor can be controlled precisely.

Figure 6:
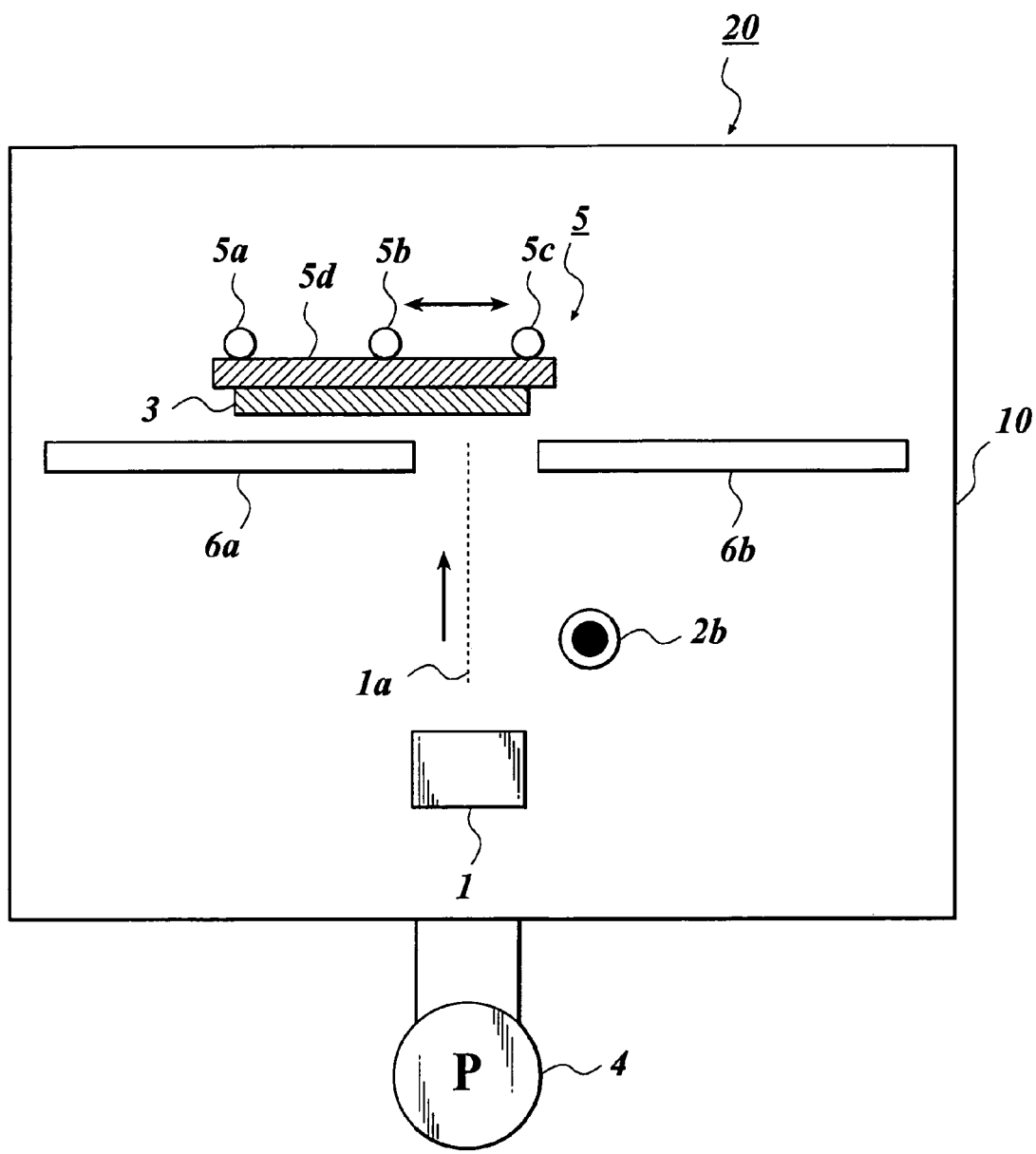
FIG. 6 is for showing the second embodiment of the present invention, and is a view showing a frame format of another example of a deposition apparatus used in formation of a photostimulable phosphor layer.

FIG. 6 is a view showing a frame format of another example of a deposition apparatus used in formation of the photostimulable phosphor layer according to the present invention.

In the apparatus shown in FIG. 6, similarly to FIG. 9, two slit-forming members 6a and 6b are disposed between the evaporation source 1 and the support 3, and it is set so that only the vapor flow 1a passed through the slit-forming members 6a and 6b will be incident to the support 3. Moreover, a photostimulable phosphor layer (not shown) is formed on the support 3 by repeating right-and-left amplitude movement of the support 3 as shown by the arrow.

However, as different from FIG. 9, in the apparatus shown in FIG. 6, a heating member 2b is provided in one face side of the support 3, and a cooling member 5 is provided on the other face side of the support 3. Thereby, the temperature adjusting function of the support 3 at the time of deposition is improved.

Since the apparatus shown in FIG. 6 uses the deposition method for depositing only the vapor flow passed through the above-described slit-forming members 6a and 6b, heating of the support 3 can be performed intermittently. Further, since cooling can be performed constantly, it is suitable for forming a film at comparatively low temperature.

Figure 7:
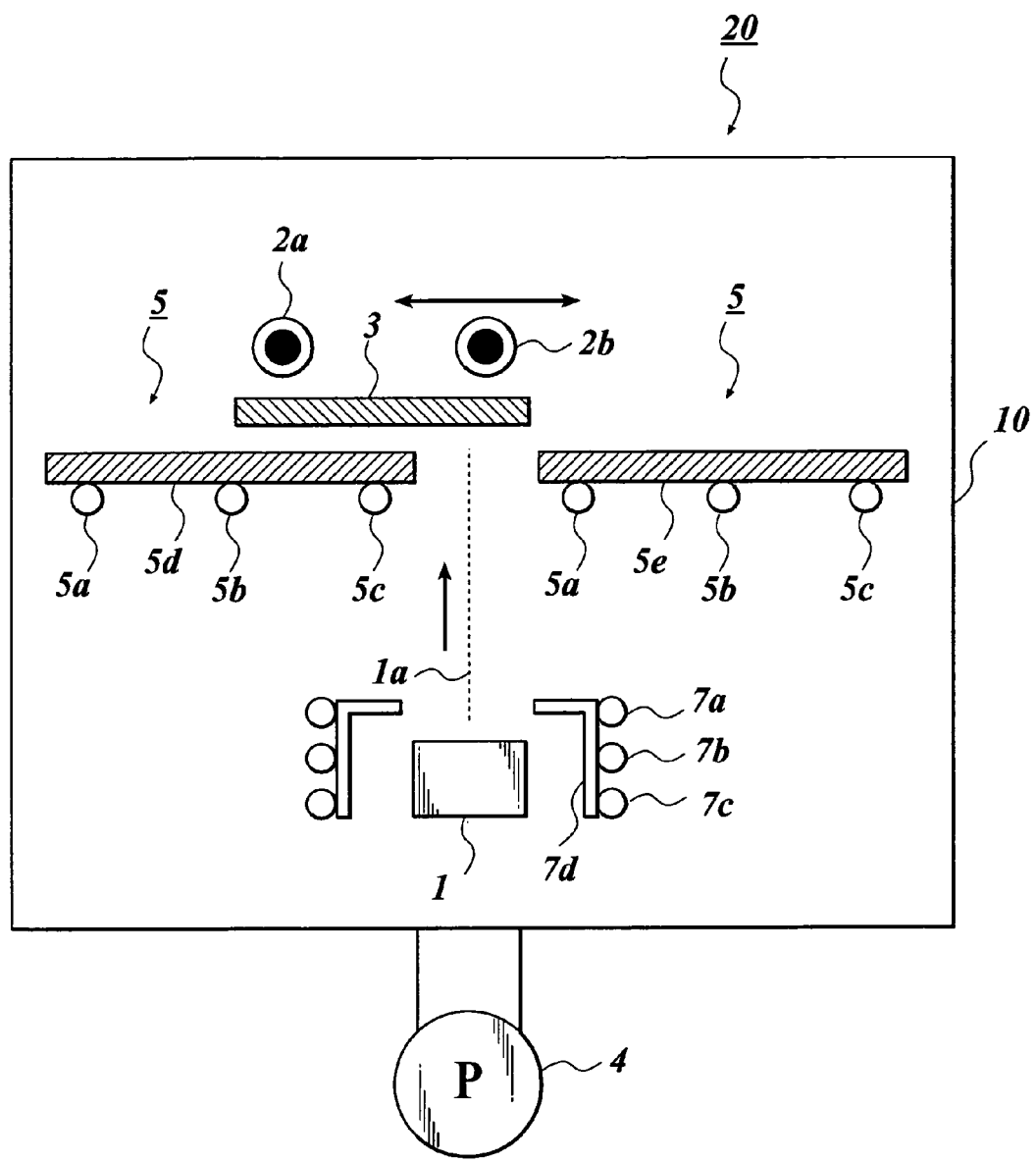
FIG. 7 is for showing the second embodiment of the present invention, and is a view showing a frame format of a further example of a deposition apparatus used in formation of a photostimulable phosphor layer.

FIG. 7 is a view showing a frame format of a further example of a deposition apparatus used in formation of the photostimulable phosphor layer according to the present invention.

In the apparatus shown in FIG. 7, similarly to FIG. 9, heating members 2a and 2b for providing thermal energy to a support 3 are disposed in the opposite side of the face of the support 3 where an evaporation source 1 is disposed. Further, support-cooling members 5d and 5e are disposed between the evaporation source 1 and the support 3 instead of the two slit-forming members 6a and 6b shown in FIG. 5. It is set so that only the vapor flow 1a passed through the slit formed by the support-cooling members 5d and 5e will be incident to the support 3. Moreover, a photostimulable phosphor layer (not shown) is formed on the support 3 by repeating right-and-left amplitude movement of the support 3 as shown by the arrows.

Further, evaporation source cooling members 7 are provided around the evaporation source 1. Each evaporation source cooling member 7 comprises cooling pipes 7a, 7b and 7c. The vapor flow 1a heading for the arrow direction from the evaporation source 1 to the support 3 is cooled beforehand at a predetermined temperature.

The apparatus shown in FIG. 7 is a structural example that heating is performed from the rear face of the support (substrate) and the cooling members are disposed in the vapor flow incident face side. In such a structure, since it becomes possible to suppress the heat of radiation from the evaporation source 1 and the latent heat according to deposition to the portions other than the support (substrate) 3 at the minimum, it is a structure suitable for forming a film at comparatively high temperature.

From the above, with the apparatuses shown in FIGS. 5 to 7, the temperature of the support 3 at the time of deposition is adjusted at a predetermined temperature set beforehand and is adjusted so that deviation of the predetermined temperature will become small by using the heating members and cooling members together. Therefore, a photostimulable phosphor layer having small variation in sensitivity or the like can be formed.

Particularly, with respect to preparation of the photostimulable phosphor layer according to the present invention, in preparation of the photostimulable phosphor layer having the photostimulable phosphor represented by Formula (1) or CsBr composition, preferably, the set temperature of the support 3 at the time of deposition is 200° C. or below, further preferably, 150° C. or below, and particularly, temperature control in a range of 50° C. to 150° C. is preferable. Thereby, it is found that a radiographic image conversion panel showing the effects described in the present invention, that is, high luminescence intensity and high sharpness can be obtained.

In the deposition apparatuses shown in FIGS. 5 to 7, which are used in formation of the photostimulable phosphor layer according to the present invention, as the heating members, halogen lamps or infrared lamps are generally used. However, the heating members are not limited to these lamps, and other heating members such as carbon heaters and the like may be used. Further, as the cooling members, the support-cooling member 5d can be cooled by pouring cooling water into a pipe closely contacted with a metal member. As a result, the support (substrate) disposed so as to be closely contacted with the member can be cooled (see FIGS. 5 and 6). Further, it is possible to suppress the support (substrate) temperature so as not to rise more than a predetermined temperature by suppressing the support-cooling member 5d so as not to become high temperature.

As the cooling medium filled in the cooling pipes and used for cooling the support-cooling member 5d, cold water is general. However, it may be oil or gas such as air or the like. Further, the above-described cooling medium is preferably filled and/or poured into the cooling pipes after performing a predetermined temperature control beforehand.

(Layer Thickness of Photostimulable Phosphor Layer)

The layer thickness of the photostimulable phosphor layer formed by these methods is preferably in a range of 10 μm to 1000 μm, and further preferably, from 20 μm to 800 μm, although it differs according to the sensitivity of the aimed radiographic image conversion panel in response to radioactive rays, the type of the photostimulable phosphor, and the like.

Further, when the photostimulable phosphor layer is prepared by using the above-described vapor phase deposition method, the photostimulable phosphor, which becomes the evaporation source, is charged in a crucible by dissolving it uniformly or by molding it with a press or hot press. In this case, it is preferable to perform degassing. In order to evaporate the photostimulable phosphor from the evaporation source, a method for scanning electron beams emitted from an electron gun may be used. However, methods besides this can be used to evaporate the photostimulable phosphor.

Further, the evaporation source is not required to be the photostimulable phosphor. It may be the one in which photostimulable phosphor raw materials are mixed.

Further, as for the activator, the one that an activator is mixed to a basic substance may be deposited, or an activator may be doped after depositing only a basic substance. For example, an activator Tl may be doped after depositing only a basic substance RbBr. That is, since the crystals are independent, it is possible to dope sufficiently even though the film is thick, and crystal growth is hardly occurred. Therefore, MTF does not deteriorate.

Doping can be performed by thermal diffusion and ion implantation method of a doping agent (activator) into a basic substance layer of the formed phosphor.

[Third Embodiment]

Further, the inventors have studied the above-described problems, and have found that the effects described in the present invention can be obtained from the radiographic image conversion panel manufactured by the method for manufacturing the radiographic image conversion panel having at least one photostimulable phosphor layer formed on a support by a vapor phase deposition method through the steps of bending one face of the support by adjusting the curvature radius R thereof so as to become in a range of 1000 mm to 10000 mm, and entering vapor flow including photostimulable phosphor raw materials in the bent convex face of the support.

That is, in the embodiment, as different from the above-mentioned first and second embodiments, the effects of the present invention are obtained by defining the shape of the support at the time of formation by a vapor phase deposition method. Here, since the other detailed descriptions are the same as those in the first embodiment, the descriptions are omitted, and only the different points will be explained.

(Setting of Shape of Support, Support Temperature, Surface Roughness of Support, Degree of Vacuum and the Like)

The thickness of the columnar crystals forming the photostimulable phosphor layer according to the present invention is affected by the support temperature, degree of vacuum, incident angle of vapor flow and the like. Therefore, it is possible to prepare columnar crystals having the desired thickness by controlling these factors.

(a) Shape of Support

At least one photostimulable phosphor layer is formed through the steps of bending one face of the support by adjusting the curvature radius R thereof so as to become in a range of 1000 mm to 10000 mm, and entering vapor flow including photostimulable phosphor raw materials in the bent convex face of the support.

In the method for manufacturing the radiographic image conversion panel of the present invention, it is an essential feature to adjust the curvature radius R of the support in a range of 1000 mm to 10000 mm. When the curvature radius R is less than 1000 mm, there occur problems such that the support (also referred to as "substrate") is cracked at the time of installation, the photostimulable phosphor layer formed is peeled off at the time of deposition, crack has found in the layer, and the like.

On the other hand, when the curvature radius R exceeds 10000 mm, there occurs a problem such that the temperature control of the support cannot be performed precisely because the installed support (substrate) is bowed.

Here, as the curvature radius, a range of 2000 mm to 9000 mm is preferable, and further preferably, 3000 mm to 8000 mm.

(b) Support Temperature

As for the support temperature, there is a tendency such that the lower the temperature is, the thinner the support becomes. However, the temperature of the support is preferably from 50° C. to 350° C., and more preferably, from 50° C. to 250° C.

(c) Degree of Vacuum

As for the degree of vacuum, it is preferable to be in a range of $5\times10^{-5}$ Pa to 1 Pa, and further preferably, in a range of $1\times10^{-4}$ Pa to 0.5 Pa.

(d) Surface Roughness Ra of Support (Value Defined in JIS B 0601)

As for the surface roughness of a support, the thickness of the columnar crystals is tend to become thin as the smoothness becomes high. Preferably, Ra is not more than 0.5, and further preferably, not more than 0.1.

(Layer Thickness of Photostimulable Phosphor Layer)

The layer thickness of the photostimulable phosphor layer formed by these methods is preferably in a range of 10 μm to 1000 μm, and further preferably, from 20 μm to 800 μm, although it differs according to the sensitivity of the aimed radiographic image conversion panel in response to radioactive rays, the type of the photostimulable phosphor, and the like.

Further, when the photostimulable phosphor layer is prepared by using the above-described vapor phase deposition method, the photostimulable phosphor, which becomes the evaporation source, is charged in a crucible by dissolving it uniformly or by molding it with a press or hot press. In this case, it is preferable to perform degassing. In order to evaporate the photostimulable phosphor from the evaporation source, there is a method for scanning electron beams emitted from an electron gun may be used. However, methods besides this can be used to evaporate the photostimulable phosphor.

Further, the evaporation source is not required to be the photostimulable phosphor. It may be the one in which photostimulable phosphor raw materials are mixed.

Further, as for the activator, the one that an activator is mixed to a basic substance may be deposited, or an activator may be doped after depositing only a basic substance. For example, an activator Tl may be doped after depositing only a basic substance RbBr. That is, since the crystals are independent, it is possible to dope sufficiently even though the film is thick, and crystal growth is hardly occurred. Therefore, MTF does not deteriorate.

Doping can be performed by thermal diffusion and ion implantation method of a doping agent (activator) into a basic substance layer of the formed phosphor.

EXAMPLES

Hereinafter, the present invention will be explained concretely by giving (A) Examples corresponding to the first embodiment (Examples 1 and 2, and Comparative Examples 1 and 2), (B) Examples corresponding to the second embodiment (Examples 11 to 13, and Comparative Examples 11 and 12) and (C) Examples corresponding to the third embodiment (Examples 21 and 22, and Comparative Examples 21 and 22), respectively. However, the embodiment of the present invention is not limited to these Examples.

(A)

<<Preparation of Radiographic Image Conversion Panel Samples 1 to 4>>

A photostimulable phosphor layer having a photostimulable phosphor (CsBr:Eu) was formed on the surface of a support of glass ceramics (produced by Nippon Electric Glass Co., Ltd.) having a thickness of 1 mm by controlling the support temperature at a temperature shown in Table 1 and by using a deposition apparatus shown in FIG. 4.

In addition, the support temperature was controlled at the temperature shown in Table 1 in the deposition apparatus shown in FIG. 4 by adjusting the angles $\theta_1$ and $\theta_2$, providing a member made of aluminum having slits (opening portions for vapor flow passage) under the support, and carrying the support from side to side parallel to the member made of aluminum. Here, the distance d between the support and the member having slits (opening portions for vapor flow passage) was made to be 60 cm. Then, deposition was performed on the surface of the support, and the thickness of the photostimulable phosphor layer was adjusted to be 300 μm.

In addition, in deposition, the support was disposed in the deposition apparatus, and then, the phosphor raw material (CsBr:Eu) as a deposition source was press-molded and charged in a tungsten boat for resistance heating deposition.

Thereafter, the air inside of the deposition apparatus was discharged once, and thereafter, Ar gas was introduced. After the degree of vacuum was adjusted to 0.133 Pa, deposition was performed by keeping the support temperature at a temperature shown in Table 1.

The deposition was terminated when the layer thickness of the photostimulable phosphor layer became 300 μm, and then, the phosphor layer was heat treated (annealed) at a temperature of 400° C.

Next, each of the radiographic image conversion panel samples 1, 2, 3 and 4 (Comparative Example 1, Comparative Example 2, Example 1 and Example 2) having a structure such that the photostimulable phosphor layer was hermetically sealed was obtained by encapsulating the support and a peripheral portion of a protective layer comprising a borosilicate glass with adhesive.

Further, the heating temperature of the phosphor raw material, which was the deposition source, in a crucible at the time of deposition was made to be 660° C.

With respect to the obtained radiographic image conversion panels 1 to 4, evaluations as follows were performed.

<<Evaluation of Adhesiveness>>(Layer Adhesion)

The adhesiveness of each sample against a substrate was evaluated by performing the following test to each sample before encapsulating the protective layer peripheral portion of each of the radiographic image conversion panels 1 to 4 having the prepared photostimulable phosphor layer on a glass substrate and hermetically sealing the photostimulable phosphor layer.

An adhesive tape was attached to the phosphor layer coating face of each of the radiographic image conversion panels 1 to 4 before sealing, and the area % of the phosphor layer adhered to the substrate when the tape was removed was measured. Then, the adhesiveness was evaluated by the standards shown in the following.

◎: Area of phosphor layer adhered to substrate was 100%
○: Area of phosphor layer adhered to substrate was 80% or more and less than 100%
Δ: Area of phosphor layer adhered to substrate was 60% or more and less than 80%
x: Area of phosphor layer adhered to substrate was less than 60%

The results are shown in Table 1.

<<Evaluation of Luminance>>

The luminance was evaluated by using the Regius 350 produced by Konica Corporation.

As obvious from the results of Table 1, Examples 1 and 2, in which the support temperature was controlled at 50° C. to 150° C., have high luminance, and further, the adhesiveness of the support with the photostimulable phosphor layer is good compared with the Comparative Examples 1 and 2, in which the support temperature was out of the above-described range.

Thus, as exemplified in the Examples, the radiographic image conversion panel according to the present invention is excellent in adhesiveness and has high luminance. Thus, excellent effects can be obtained by the present invention.

TABLE 1

| RADIOGRAPHIC IMAGE CONVERSION PANEL SAMPLE | SUPPORT TEMPERATURE (° C.) | LUMINANCE | ADHESIVE-NESS |
|---|---|---|---|
| SAMPLE 1 (COMPARATIVE EXAMPLE 1) | 200 | 0.5 | X |
| SAMPLE 2 (COMPRATIVE EXAMPLE 2) | 45 | 0.4 | Δ |
| SAMPLE 3 (EXAMPLE 1) | 130 | 0.8 | ○ |
| SAMPLE 4 (EXAMPLE 2) | 70 | 1.0 | ◎ |

(B)

<<Preparation of Radiographic Image Conversion Panel Sample 11>>

COMPARATIVE EXAMPLE 11

A radiographic image conversion panel sample 11 having a deposition type phosphor layer was prepared in accordance with the manufacturing method described in the following.

(Preparation of Photostimulable Phosphor Plate 11)

A glass ceramics substrate having a thickness of 500 μm was disposed in a vacuum chamber 10 (also referred to as "vacuum container") of a deposition apparatus 20 in earlier technology as shown in FIG. 8. Further, as an evaporation source, phosphors having CsBr:0.001Eu composition were filled in a crucible made of Mo, and were disposed in the vacuum chamber 20 in the same manner.

After the phosphors were deposited, the air in the vacuum chamber 20 was discharged by using a vacuum pump so as to become $1 \times 10^{-4}$ Pa. Thereafter, Ar gas was introduced, and the vacuum chamber 20 was adjusted at $1 \times 10^{-2}$ Pa.

Next, as heating members, halogen lamps disposed in the vacuum chamber (vacuum container) 20 were used to heat a support (substrate) 3. Then, the electric power of the halogen lamps was adjusted to control the temperature of the support (substrate) 3 at 100° C.

With respect to temperature change of the support 3 at the time of deposition, a commercial temperature sensor is disposed on the support 3, and the temperature change from the beginning to the end of the deposition was recorded. Then, the deviation in response to a predetermined temperature 100° C. was calculated. Here, as for the calculation of the deviation, the temperature of the support 3 was recorded at intervals of 1 minute from the beginning to the end of the deposition. As recorded points, the standard deviation was calculated from approximately 40 (between 35 and 45) points of temperature data, and this was made to be the deviation.

Next, the Mo crucible was heated to evaporate CsBr:0.001Eu, and CsBr:0.001Eu was deposited at a deposition rate of 10 μm/min. When the layer thickness had become 400 μm, the deposition was terminated.

(Preparation of Radiographic Image Conversion Panel Sample 11)

A radiographic image conversion panel sample 11 was prepared by using the photostimulable phosphor plate 11 prepared above. In detail, a protective layer made of glass was provided via a spacer to a glass-like side edge portion of the support 3 having the photostimulable phosphor layer so that the thickness of an air layer as a low refractive index layer between each photostimulable phosphor layer and the glass used as the protective layer would become 100 µm. In addition, as the spacer, the one made of glass ceramics and whose thickness was adjusted so that the thickness of the photostimulable phosphor layer and the low refractive index layer (air layer) in between the support 3 and the protective layer glass would become a predetermined thickness was used. The side edge portions of the glass support and the protective layer made of glass were adhered by using an epoxy system adhesive, and the radiographic image conversion panel sample 11 was prepared.

<<Preparation of Radiographic Image Conversion Panel 12>>

COMPARATIVE EXAMPLE 12

A radiographic image conversion panel sample 12 was prepared similarly to the preparation of the radiographic image conversion panel sample 11 except that a deposition apparatus described in Table 2-1was used.

<<Preparation of Radiographic Image Conversion Panel Samples 13 to 15>>

EXAMPLES 11 TO 13 OF THE PRESENT INVENTION

Each of radiographic image conversion panel samples 13 to 15 was prepared similarly to the preparation of the radiographic image conversion panel sample 11 except that a deposition apparatus described in Table 2-1was used.

The luminescence luminance and the sharpness of each of the obtained radiographic image conversion panel samples 11 to 15 were evaluated as follows.

<<Evaluation of Sharpness>>

The sharpness was evaluated by obtaining the modulation transfer function (MTF).

After a CTF chart was stuck on each radiographic image conversion panel sample, 10 mR of 80 kVp X-ray (the distance to the subject; 1.5 m) was irradiated to the radiographic image conversion panel sample. Thereafter, the CTF chart was scanned and read by using a semiconductor laser having a diameter of 100 µmφ (690 nm, the power on the panel was 40 mW). Thus, the MTF was obtained. The values described in Table 1 are the relative values with respect to each panel by using the MTF value of the radiographic image conversion panel sample 13 at 0.51 p/mm as 1.00.

<<Evaluation of Luminance (Sensitivity)>>

After an X-ray having a tube voltage of 80 kVp was irradiated from the rear side of the phosphor sheet support to each radiographic image conversion panel, each panel was excited by being operated with He—Ne laser beams (633 nm). Then, the photostimulated luminescence emitted from the phosphor layer was received by a receiver (a photomultiplier with a spectral sensitivity S-5), and its intensity was measured. This intensity was defined as the luminance. The luminance was shown as relative values by using the luminance of the radiographic image conversion panel sample 13 as 1.00.

The obtained results are shown in Tables 2-1 and 2-2.

TABLE 2-1

| RADIOGRAPHIC IMAGE CONVERSION PANEL SAMPLE | PHOTOSTIMULABLE PHOSPHOR (COMPOSITION) | DEPOSITION APPARATUS (APPARATUS FORM) | TEMPERATURE ADJUSTMENT TO SUPPORT |
|---|---|---|---|
| SAMPLE 11 (COMPARATIVE EXAMPLE 11) | CsBr:0.001Eu | FIG. 8 | HEATING ONLY |
| SAMPLE 12 (COMPARATIVE EXAMPLE 12) | CsBr:0.001Eu | FIG. 9 | HEATING ONLY |
| SAMPLE 13 (EXAMPLE 11) | CsBr:0.001Eu | FIG. 5 | HEATING AND COOLING |
| SAMPLE 14 (EXAMPLE 12) | CsBr:0.001Eu | FIG. 6 | HEATING AND COOLING |
| SAMPLE 15 (EXAMPLE 13) | CsBr:0.001Eu | FIG. 7 | HEATING AND COOLING |

TABLE 2-2

| RADIOGRAPHIC IMAGE CONVERSION PANEL SAMPLE | DEVIATION TO 100° C. | SENSITIVITY | SHARPNESS |
|---|---|---|---|
| SAMPLE 11 (COMPARATIVE EXAMPLE 11) | ±50° C. | 0.48 | 0.74 |
| SAMPLE 12 (COMPARATIVE EXAMPLE 12) | ±30° C. | 0.72 | 0.82 |
| SAMPLE 13 (EXAMPLE 11) | ±3° C. | 1.00 | 1.00 |
| SAMPLE 14 (EXAMPLE 12) | ±3° C. | 1.12 | 0.98 |
| SAMPLE 15 (EXAMPLE 13) | ±10° C. | 0.95 | 0.96 |

As obvious from the results in Tables 2-1and 2-2, Examples 11 to 13, in which deposition apparatuses having members for heating one face of the support and cooling the other face of the support as shown in FIGS. 5 to 7 were used, are excellent in sensitivity and sharpness compared with Comparative Examples 11 and 12, in which a deposition apparatus only having heating members as shown in FIG. 8 or 9 was used.

Thus, as exemplified in Example, the radiographic image conversion panel according to the present invention has effects of being excellent in both luminescence intensity and sharpness.

(C)

<<Preparation of Radiographic Image Conversion Panel Sample 21>>

COMPARATIVE EXAMPLE 21

A radiographic image conversion panel sample 21 having a deposition type phosphor layer was prepared according to the method described as follows.

(Preparation of Support 21)

A light reflecting layer was provides as follows on a transparent glass ceramics having a thickness of 500 μm, and a support 21 was prepared. The surface roughness (Ra) of the support 21 was 0.01.

(Formation of Light Reflecting Layer)

Film formation of titanium oxide produced by Furuuchi Chemical Co., Ltd. and zirconium oxide produced by Furuuchi Chemical Co., Ltd. was performed to the surface of the support 21 by using a deposition apparatus so that the reflectance at 400 nm would become 85% and the reflectance at 660 nm would become 20%.

(Preparation of Photostimulable Phosphor Plate 21)

The support 21 prepared above was bent so that the curvature radius R would become 20000 mm, and was disposed in a vacuum chamber. Next, the support 21 was heated so that the support temperature would become 240° C. Then, nitrogen gas was introduced in the vacuum chamber, and the vacuum chamber was adjusted under reduced pressure to make the degree of vacuum at 0.27 Pa. Thereafter, an alkali halide phosphor comprising CsBr:0.001Eu was deposited on one face of the support 21 by using a well-known deposition apparatus and a slit made of aluminum. The incident angle of the alkali halide phosphor against the normal line direction of the support surface was 0°, and the distance between the support 21 and the slit (deposition source) was made to be 60 cm. Moreover, the deposition was performed by carrying the support 21 so that the minimal distance between the convex face of the support 21 and the deposition source would always become constant. Thus, a phosphor layer having a columnar structure with a thickness of 300 μm was formed.

A radiographic image conversion panel sample 21 was prepared by using the photostimulable phosphor plate 21 prepared above. In detail, a protective layer made of glass was provided via a spacer to a glass-like side edge portion of the support 3 having the photostimulable phosphor layer so that the thickness of an air layer as a low refractive index layer between each photostimulable phosphor layer and the glass used as the protective layer would become 100 μm. In addition, as the spacer, the one made of glass ceramics and whose thickness was adjusted so that the thickness of the photostimulable phosphor layer and the low refractive index layer (air layer) in between the support 3 and the protective layer glass would become a predetermined thickness was used. The side edge portions of the glass support and the protective layer made of glass were adhered by using an epoxy system adhesive, and the radiographic image conversion panel sample 21 was prepared.

<<Preparation of Radiographic Image Conversion Panel Samples 22 to 24>>

Each of radiographic image conversion panel samples 22 to 24 was prepared similarly to the preparation of the radiographic image conversion panel sample 21 except that each curvature radius R of the support at the time of formation of each photostimulable phosphor layer was changed as described in Table 3.

The luminance unevenness and the outward of each photostimulable phosphor plate were evaluated with respect to each of the obtained radiographic image conversion panel samples 21 to 24.

<<Evaluation of Luminance Unevenness>>

An X-ray was irradiated to the above-described plate by using a tungsten bulb and adjusting the distance between an exposure source, which was set at 80 kVp and 10 mAs, and the plate at 2 m. Thereafter, the plate was placed to the Regius 150 (produced by Konica Corporation) to read the luminance luminescence. Then, the standard deviation (S.D. value) of digital signals on uniform image data was obtained to evaluate it as the luminance unevenness.

Herein, the smaller the value is, the smaller the luminance unevenness is.

<<Outward of Photostimulable Phosphor Plate>>

Each surface of the photostimulable phosphor plates 21 to 24 used in each of the radiographic image conversion panel samples 21 to 24 was evaluated visually, and rank evaluation as follows was performed.

○: No abnormalities on the surface of the phosphor plate

Δ: Cracks were recognized in several portions of the surface of the phosphor plate x: Deposited film formed on the surface of the phosphor plate was cracked.

In the present invention, the ones with a circle mark (○) are practicable.

The obtained results are shown in Table 3.

TABLE 3

| RADIOGRAPHIC IMAGE CONVERSION PANEL SAMPLE | SUPPORT (GLASS CERAMICS) | CURVATURE RADIUS R (mm) AT THE TIME OF PREPARATION OF PHOSPHOR LAYER | LUMINANCE UNEVENNESS (S.D.) | OUTWARD OF PLATE |
|---|---|---|---|---|
| SAMPLE 21 (COMPARATIVE EXAMPLE 21) | 500 μm | 20000 | 15.1 | ○ |
| SAMPLE 22 (COMPARATIVE EXAMPLE 22) | 500 μm | 500 | INCAPABLE MEASUREMENT | X |
| SAMPLE 23 (EXAMPLE 21) | 500 μm | 3000 | 6.2 | ○ |
| SAMPLE 24 (EXAMPLE 22) | 500 μm | 6000 | 5.6 | ○ |

As obvious from Table 3, Examples 21 and 22, in which deposition was performed by bending one face of the support so that the curvature radius R thereof would become in a range of 1000 mm to 10000 mm, have little luminance unevenness, and there are no abnormalities in the outward of each phosphor plate compared with Comparative Examples 21 and 22, in which the curvature radius was out of the above-described range.

Thus, as exemplified in Examples, according to the method for manufacturing the radiographic image conversion panel according to the present invention, a radiographic image conversion panel without luminance unevenness can be provided.

In the above, the Example of the present invention are explained. However, it is needless to say that the present invention is not limited to such Examples, but various modifications are possible in a range within the scope of the present invention.

According to the present invention, a radiographic image conversion panel which is excellent in durability since the adhesiveness of a photostimulable phosphor layer with a support is good, further, which is excellent in luminance, and moreover, which shows high luminescence intensity and high sharpness; and a method for manufacturing the radiographic image conversion panel can be provided.

The entire disclosure of Japanese Patent Applications Nos. 2003-32238, 2003-47252 and 2003-47253 filed on Feb. 10, 2003, Feb. 25, 2003 and Feb. 25, 2003, respectively, including specification, claims, drawings and summary are incorporated herein by reference in its entirety.

What is claimed is:

1. A radiographic image conversion panel comprising:
a support; and
at least one photostimulable phosphor layer formed on the support by a vapor phase deposition method,
wherein the at least one photostimulable phosphor layer is formed during simultaneous steps of heating one face of the support and cooling the other face of the support when entering vapor flow including photostimulable phosphor raw materials to the support.

2. The panel of claim 1, wherein the at least one photostimulable phosphor layer contains a photostimulable phosphor represented by the following Formula (1), $$M^1X.aM^2X'_2.bM^3X''_3:eA \qquad (1)$$

wherein the $M^1$ is at least one alkali metal atom selected from the group consisting of Li, Na, K, Rb and Cs; the $M^2$ is at least one bivalent metal atom selected from the group consisting of Be, Mg, Ca, Sr, Ba, Zn, Cd, Cu and Ni; the $M^3$ is at least one tervalent metal atom selected from the group consisting of Sc, Y, La, Ce, Pr, Nd, Pm, Sm, Eu, Gd, Tb, Dy, Ho, Er, Tm, Yb, Lu, Al, Ga and In; each of the X, X' and X" is at least one halogen atom selected from the group consisting of F atom, Cl atom, Br atom and I atom; the A is at least one metal atom selected from the group consisting of Eu, Tb, In, Ce, Tm, Dy, Pr, Ho, Nd, Yb, Er, Gd, Lu, Sm, Y, Tl, Na, Ag, Cu and Mg; and each of the a, b and e represents a numeric value in a range of $0 \leq a < 0.5$, $0 \leq b < 0.5$ and $0 < e \leq 0.2$.

3. The panel of claim 1, wherein the at least one photostimulable phosphor layer contains a photostimulable phosphor including CsBr.

4. The panel of claim 2, wherein the at least one photostimulable phosphor layer contains a photostimulable phosphor including CsBr.

5. A method of forming a radiographic image conversion panel comprising the simultaneous steps of:
forming at least one photostimulable phosphor layer on a support by a vapor phase deposition method;
heating one face of the support; and
cooling the other face of the support.

6. The method of claim 5, wherein the at least one photostimulable phosphor layer contains a photostimulable phosphor represented by the following Formula (1), $$M^1X.aM^2X'_2.bM^3X''_3:eA \qquad (1)$$

wherein the $M^1$ is at least one alkali metal atom selected from the group consisting of Li, Na, K, Rb and Cs; the $M^2$ is at least one bivalent metal atom selected from the group consisting of Be, Mg, Ca, Sr, Ba, Zn, Cd, Cu and Ni; the $M^3$ is at least one tervalent metal atom selected from the group consisting of Sc, Y, La, Ce, Pr, Nd, Pm, Sm, Eu, Gd, Tb, Dy, Ho, Er, Tm, Yb, Lu, Al, Ga and In; each of the X, X' and X" is at least one halogen atom selected from the group consisting of F atom, Cl atom, Br atom and I atom; the A is at least one metal atom selected from the group consisting of Eu, Tb, In, Ce, Tm, Dy, Pr, Ho, Nd, Yb, Er, Gd, Lu, Sm, Y, Tl, Na, Ag, Cu and Mg; and each of the a, b and e represents a numeric value in a range of $0 \leq a < 0.5$, $0 \leq b < 0.5$ and $0 < e \leq 0.2$.

7. The method of claim 5, wherein the at least one photostimulable phosphor layer contains a photostimulable phosphor including CsBr.

8. The method of claim 6, wherein the at least one photostimulable phosphor layer contains a photostimulable phosphor including CsBr.

* * * * *